(12) United States Patent
Zou

(10) Patent No.: US 12,206,353 B2
(45) Date of Patent: Jan. 21, 2025

(54) DRIVE CONTROL APPARATUS FOR BRUSHLESS MOTOR AND RELATED DEVICE

(71) Applicant: Honor Device Co., Ltd., Shenzhen (CN)

(72) Inventor: Wenbo Zou, Shenzhen (CN)

(73) Assignee: HONOR DEVICE CO., LTD., Shenzhen (CN)

( * ) Notice: Subject to any disclaimer, the term of this patent is extended or adjusted under 35 U.S.C. 154(b) by 0 days.

(21) Appl. No.: 18/041,765

(22) PCT Filed: Aug. 29, 2022

(86) PCT No.: PCT/CN2022/115422
§ 371 (c)(1),
(2) Date: Feb. 15, 2023

(87) PCT Pub. No.: WO2023/040639
PCT Pub. Date: Mar. 23, 2023

(65) Prior Publication Data
US 2024/0154553 A1  May 9, 2024

(30) Foreign Application Priority Data
Sep. 15, 2021 (CN) .......................... 202111081378.5

(51) Int. Cl.
*H02P 6/24* (2006.01)
*H02P 6/28* (2016.01)
*H02P 29/40* (2016.01)

(52) U.S. Cl.
CPC .................. *H02P 6/24* (2013.01); *H02P 6/28* (2016.02); *H02P 29/40* (2016.02); *H02P 2209/09* (2013.01)

(58) Field of Classification Search
CPC ............... H02P 6/24; H02P 6/28; H02P 29/40
See application file for complete search history.

(56) References Cited

U.S. PATENT DOCUMENTS 5,291,106 A * 3/1994 Murty ...................... H02P 6/24
318/370
7,170,245 B2 * 1/2007 Youm ...................... H02P 3/22
318/362

(Continued)

FOREIGN PATENT DOCUMENTS

| CN | 101694979 B | 11/2011 |
| CN | 103121409 A | 5/2013 |

(Continued)

*Primary Examiner* — Thai T Dinh
(74) *Attorney, Agent, or Firm* — Conley Rose, P.C.

(57) ABSTRACT

A drive control apparatus for a brushless motor and a related device. The drive control apparatus is configured to more quickly turn off the brushless motor and includes a motor drive circuit connected to the brushless motor, and a discharge circuit connected to the brushless motor and the motor drive circuit. The motor drive circuit is configured to, during a turn-off period of the brushless motor, stop supplying power to the brushless motor, and output an induced current generated by the brushless motor to the discharge circuit. The discharge circuit is configured to, during the turn-off period of the brushless motor, receive the induced current, and apply work by using the induced current, to consume electric energy of the brushless motor, and accelerate turn-off of the brushless motor.

20 Claims, 17 Drawing Sheets

(56) References Cited

U.S. PATENT DOCUMENTS

| | | | |
|---|---|---|---|
| 8,823,298 B2* | 9/2014 | He | H02P 3/18 |
| | | | 318/362 |
| 9,178,448 B2* | 11/2015 | Ogawa | H02P 3/22 |
| 10,541,622 B2 | 1/2020 | Kohei et al. | |
| 10,886,764 B2 | 1/2021 | Yoshikazu et al. | |
| 11,043,913 B2 | 6/2021 | Yoneda | |
| 11,716,041 B2* | 8/2023 | Wang | H02P 29/025 |
| | | | 318/445 |
| 2018/0175759 A1 | 6/2018 | Iino | |

FOREIGN PATENT DOCUMENTS

| | | |
|---|---|---|
| CN | 203788145 U | 8/2014 |
| CN | 107107327 A | 8/2017 |
| CN | 107800336 A | 3/2018 |
| CN | 109417355 A | 3/2019 |
| CN | 111030519 A | 4/2020 |
| CN | 210927489 U | 7/2020 |
| CN | 113938059 A | 1/2022 |
| EP | 3641125 A1 | 4/2020 |
| JP | 2008018131 A | 1/2008 |

* cited by examiner

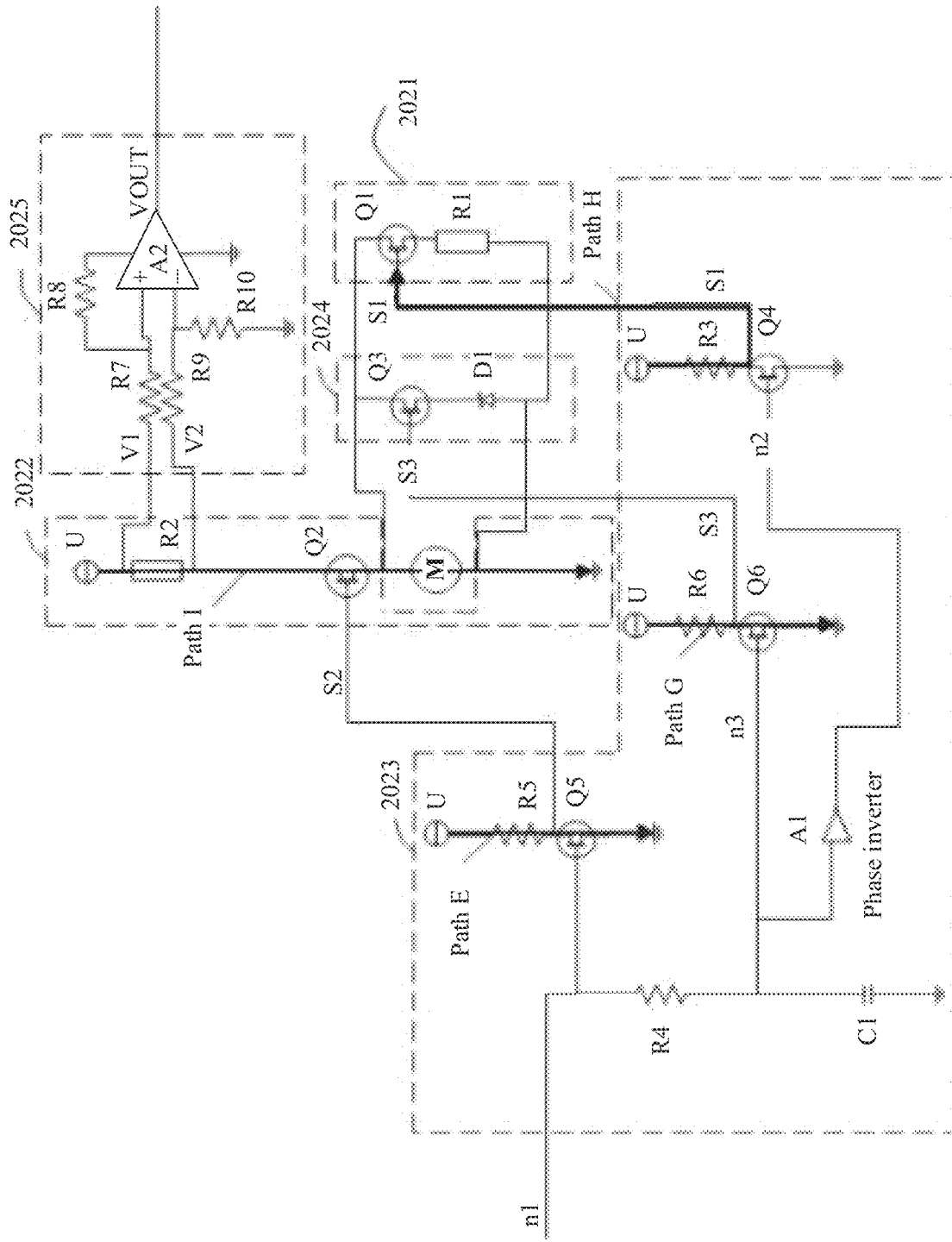
FIG. 3c(1)

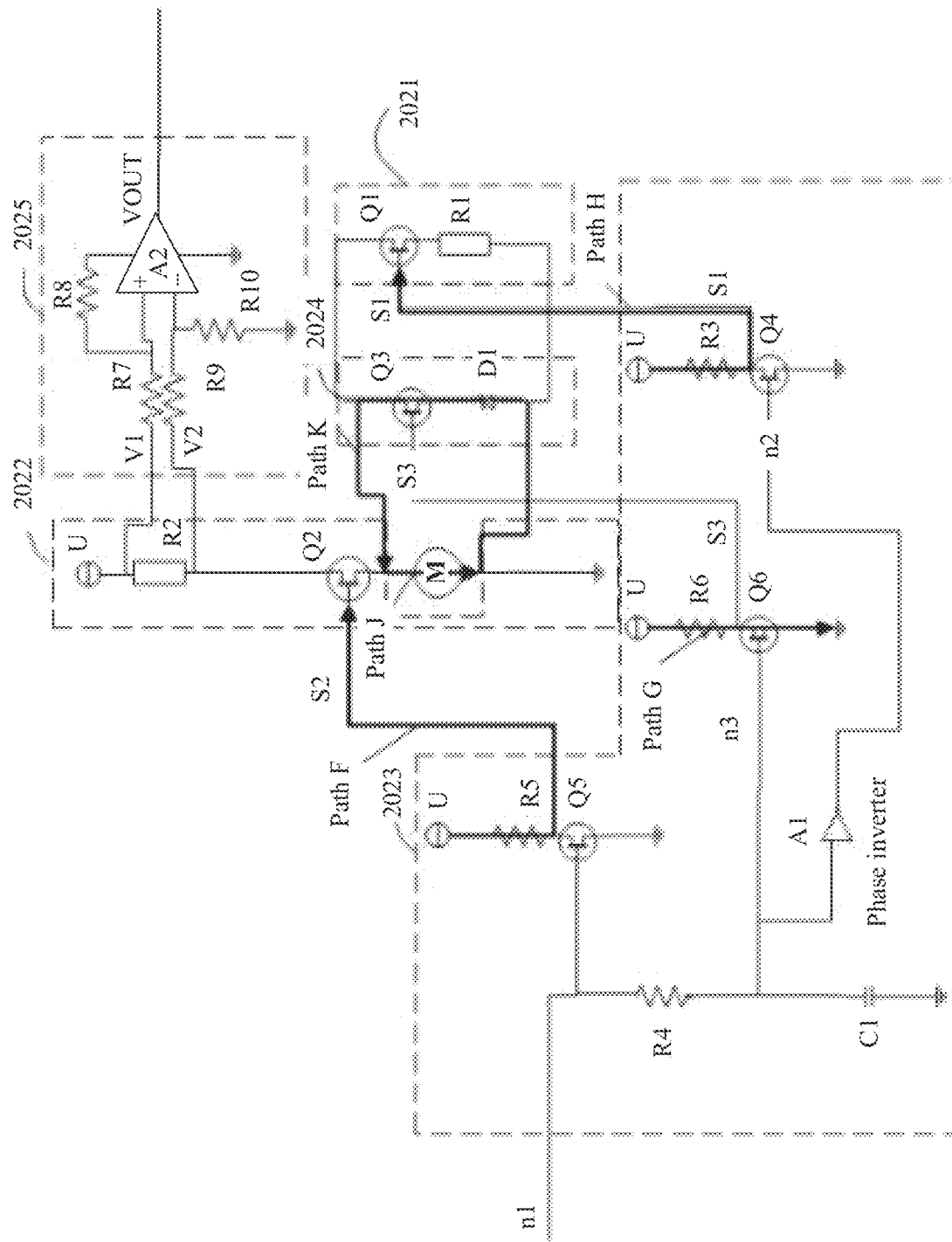
FIG. 3c(2)

ized Patent Application No. 202111081378.5, filed with the China National Intellectual Property Administration on Sep. 15, 2021, both of which are incorporated herein by reference in its their entireties.

DRIVE CONTROL APPARATUS FOR BRUSHLESS MOTOR AND RELATED DEVICE

CROSS-REFERENCE TO RELATED APPLICATIONS

This application is a U.S. National Stage of International Application No. PCT/CN2022/115422 filed on Aug. 29, 2022, which claims priority to Chinese Patent Application No. 202111081378.5, filed with the China National Intellectual Property Administration on Sep. 15, 2021, both of which are incorporated herein by reference in its their entireties.

TECHNICAL FIELD

This application relates to the field of drive control technologies, and in particular, to a drive control apparatus for a brushless motor and a related device.

BACKGROUND

An electronic device, such as a mobile phone, a tablet, or a smart watch, usually has a vibration function. For example, a mobile phone vibrates to notify a user that there is a new message. The vibration function of the electronic device is implemented by using a brushless motor. When a processor of the electronic device controls the brushless motor to be turned on, the brushless motor generates vibration. When the processor of the electronic device controls the brushless motor to be turned off, the brushless motor stops vibration.

However, in the conventional technology, a turn-off response time in a process in which a processor controls a brushless motor to be turned off is relatively long, that is, a time period from a moment at which the processor starts to control the brushless motor to be turned off to a moment at which the brushless motor actually stops vibration is relatively long, power consumption is relatively high, and vibration of a mobile phone cannot be quickly stopped.

SUMMARY

This application provides a drive control apparatus for a brushless motor and a related device, to resolve a problem that a brushless motor cannot be quickly turned off.

To achieve the foregoing objective, this application provides the following technical solutions.

According to a first aspect, this application discloses a drive control apparatus for a brushless motor and a related device. The drive control apparatus for a brushless motor includes: a motor drive circuit, where the motor drive circuit is connected to the brushless motor; and a discharge circuit, where the discharge circuit is connected to the brushless motor and the motor drive circuit. The motor drive circuit is configured to: in a turn-off period of the brushless motor, stop supplying power to the brushless motor, and output an induced current generated by the brushless motor to the discharge circuit. The discharge circuit is configured to: in the turn-off period of the brushless motor, receive the induced current, and apply work by using the induced current, to consume electric energy of the brushless motor.

In this embodiment of this application, after the motor drive circuit stops supplying power to the brushless motor in the turn-off period of the brushless motor, the induced current generated by the brushless motor may be output to the discharge circuit, so that the discharge circuit can apply work by using the induced current, to consume the electric energy of the brushless motor. In this way, the brushless motor can use up stored energy as soon as possible, so that duration required for completely turning off the brushless motor is shortened, and the brushless motor is quickly turned off.

In a possible implementation, the discharge circuit is configured to: in the turn-off period of the brushless motor, receive the induced current under control of a first drive signal, and apply work by using the induced current, to consume the electric energy of the brushless motor.

In another possible implementation, the discharge circuit is configured to: in the turn-off period of the brushless motor, receive the induced current under control of the first drive signal, and enable the induced current to flow through a discharge component, to apply work by using the discharge component. When the current flows through the discharge component, the discharge component can convert the electric energy into internal energy for consumption.

In another possible implementation, the discharge circuit is further configured to: under control of the first drive signal, not apply work by using the discharge component in each of a turn-on period and a stable working period of the brushless motor. In each of the turn-on period and the stable working period of the brushless motor, the electrical energy of the brushless motor is used to maintain running, and does not need to be consumed by the discharge component by applying work.

In another possible implementation, the discharge circuit includes a first switching transistor and the discharge component. A first end of the first switching transistor is connected to one end of the discharge component, a second end of the first switching transistor is connected to a first end of the brushless motor, and a control end of the first switching transistor receives the first drive signal. The first drive signal controls the first switching transistor to be conducted in the turn-off period of the brushless motor, the other end of the discharge component is connected to a second end of the brushless motor, and a common end between the discharge component and the brushless motor is grounded.

In another possible implementation, the discharge component is a first resistor.

In another possible implementation, the motor drive circuit is configured to: in the turn-off period of the brushless motor, stop, under control of a second drive signal, supplying power to the brushless motor, and output the induced current generated by the brushless motor to the discharge circuit.

In another possible implementation, the motor drive circuit is further configured to: in the stable working period of the brushless motor, when the second drive signal is in a first level state, supply power to the brushless motor; or when the second drive signal is in a second level state, stop supplying power to the brushless motor, and output the induced current generated by the brushless motor to a freewheeling circuit. The second drive signal in the stable working period is a pulse width modulation signal.

In this embodiment of this application, the first level state may be a low-level state, and the second level state may be a high-level state. Alternatively, the first level state may be a high-level state, and the second level state may be a low-level state. Because the second drive signal is a pulse width modulation signal, and is not always in a same level state, power is not always supplied to the brushless motor, and power consumption of the brushless motor in the stable working period is relatively low.

In another possible implementation, the motor drive circuit is further configured to continuously provide an overvoltage turn-on voltage for the brushless motor under control of the second drive signal in the turn-on period of the brushless motor.

In this embodiment of this application, in the turn-on period of the brushless motor, the overvoltage turn-on voltage is continuously provided for the brushless motor under control of the second drive signal, so that the brushless motor can be quickly turned on in an overvoltage state. In this way, duration of the turn-on period is reduced, and the brushless motor is quickly turned on.

In another possible implementation, the motor drive circuit includes a second switching transistor and a second resistor. A first end of the second switching transistor is connected to one end of the second resistor, a second end of the second switching transistor is connected to the first end of the brushless motor, and a control end of the second switching transistor receives the second drive signal. The second end of the brushless motor is grounded, and the second drive signal controls the second switching transistor to be cut off in the turn-off period. The other end of the second resistor receives a supply voltage.

In another possible implementation, the drive control apparatus for the brushless motor further includes the freewheeling circuit, and the freewheeling circuit is connected to the brushless motor and the motor drive circuit. The freewheeling circuit is configured to perform freewheeling on the induced current in the brushless motor under control of a third drive signal in the stable working period of the brushless motor.

In this embodiment of this application, the freewheeling circuit can perform freewheeling on the induced current in the brushless motor under control of the third drive signal in the stable working period of the brushless motor, so that the brushless motor can maintain a stable working state, and a case in which the brushless motor stops running in the stable working period because the motor drive circuit stops supplying power to the brushless motor does not occur.

In another possible implementation, the freewheeling circuit includes a third switching transistor and a diode. A first end of the third switching transistor is connected to a cathode of the diode, a second end of the third switching transistor is connected to the first end of the brushless motor, a control end of the third switching transistor receives the third drive signal, an anode of the diode is connected to the second end of the brushless motor, and a common end between the diode and the brushless motor is grounded.

In another possible implementation, if the discharge circuit is controlled by the first drive signal, the drive control apparatus for the brushless motor further includes a drive signal generation circuit, where the drive signal generation circuit is connected to the discharge circuit. The drive signal generation circuit is configured to: receive a first control signal, and generate and output the first drive signal under control of the first control signal.

In another possible implementation, the drive signal generation circuit is configured to: receive the first control signal, and invert the first control signal to obtain a second control signal; and generate and output the first drive signal under control of the second control signal.

In another possible implementation, the drive signal generation circuit includes a third resistor, a fourth resistor, a fourth switching transistor, a first capacitor, and a phase inverter. One end of the third resistor receives the supply voltage, and the other end of the third resistor is connected to a second end of the fourth switching transistor. A first end of the fourth switching transistor is grounded, and a control end of the fourth switching transistor receives the second control signal. One end of the fourth resistor receives the first control signal, the other end of the fourth resistor is connected to one end of the first capacitor, and a common end between the third resistor and the fourth switching transistor outputs the first drive signal. The other end of the first capacitor is grounded, a common end between the fourth resistor and the first capacitor outputs a third control signal, an input end of the phase inverter is connected to the common end between the fourth resistor and the first capacitor, an output end of the phase inverter is connected to the control end of the fourth switching transistor, the input end of the phase inverter receives the third control signal, and the output end of the phase inverter outputs the second control signal.

In another possible implementation, if the motor drive circuit is controlled by the second drive signal, the drive signal generation circuit is further configured to generate and output the second drive signal under control of the first control signal.

In another possible implementation, when the drive signal generation circuit is configured to generate the second drive signal, the drive signal generation circuit further includes a fifth resistor and a fifth switching transistor. A first end of the fifth switching transistor is grounded, a control end of the fifth switching transistor receives the first control signal, a common end between the fifth resistor and the fifth switching transistor outputs the second drive signal, one end of the fifth resistor receives the supply voltage, and the other end of the fifth resistor is connected to a second end of the fifth switching transistor.

In another possible implementation, if the drive control apparatus for the brushless motor includes the freewheeling circuit, and the freewheeling circuit is controlled by the third drive signal, the drive signal generation circuit is further configured to generate and output the third drive signal under control of the first control signal.

In another possible implementation, when the drive signal generation circuit is configured to generate the third drive signal, the drive signal generation circuit further includes a sixth resistor and a sixth switching transistor. One end of the sixth resistor receives the supply voltage, the other end of the sixth resistor is connected to a second end of the sixth switching transistor, a first end of the sixth switching transistor is grounded, a control end of the sixth switching transistor receives the third control signal, a common end between the sixth switching transistor and the sixth resistor outputs the third drive signal, the third control signal is output from the common end between the fourth resistor and the first capacitor, and a branch in which the fourth resistor and the first capacitor are located receives the first control signal.

In another possible implementation, the drive signal generation circuit is configured to be connected to a processor of an electronic device, and the first control signal is sent by the processor.

In another possible implementation, the drive control apparatus for the brushless motor further includes a current monitoring circuit, and the current monitoring circuit is connected to the motor drive circuit. The current monitoring circuit is configured to: receive a first monitoring voltage output by the motor drive circuit, and amplify the first monitoring voltage, to obtain and output a second monitoring voltage. The first monitoring voltage is used to reflect a current value of the brushless motor.

In this embodiment of this application, because the second monitoring voltage is obtained after the first monitoring voltage is amplified, the second monitoring voltage output by the current monitoring circuit can also reflect the current value of the brushless motor. The current value of the brushless motor may be determined by using a value of the second monitoring voltage.

In another possible implementation, the current monitoring circuit includes a seventh resistor, an eighth resistor, a ninth resistor, a tenth resistor, and an operational amplifier. One end of the seventh resistor receives a first voltage, the other end of the seventh resistor is connected to an in-phase input end of the operational amplifier, one end of the eighth resistor is connected to the in-phase input end of the operational amplifier, the other end of the eighth resistor is connected to a positive power end of the operational amplifier, one end of the ninth resistor receives a second voltage, the other end of the ninth resistor is connected to an inverting input end of the operational amplifier, a difference between the first voltage and the second voltage is a value of the first monitoring voltage, one end of the tenth resistor is connected to the inverting input end of the operational amplifier, the other end of the tenth resistor is grounded, a negative power end of the operational amplifier is grounded, and an output end of the operational amplifier outputs the second monitoring voltage.

In another possible implementation, the current monitoring circuit is configured to be connected to the processor of the electronic device, and the second monitoring voltage output by the current monitoring circuit is received by the processor.

According to a second aspect, this application discloses an electronic device, including the drive control apparatus fora brushless motor according to the first aspect and a brushless motor.

It should be understood that descriptions of technical features, technical solutions, beneficial effects, or similar expressions in this application are not intended to imply that all features and advantages can be implemented in any single embodiment. On the contrary, it may be understood that descriptions of features or beneficial effects mean that specific technical features, technical solutions or beneficial effects are included in at least one embodiment. Therefore, descriptions of technical features, technical solutions, or beneficial effects in this specification do not necessarily refer to a same embodiment. Further, the technical features, technical solutions, and beneficial effects described in the embodiments may be combined in any appropriate manner. A person skilled in the art should understand that an embodiment may be implemented without one or more specific technical features, technical solutions, or beneficial effects in a specific embodiment. In other embodiments, additional technical features and beneficial effects may be identified in a specific embodiment that does not reflect all embodiments.

BRIEF DESCRIPTION OF DRAWINGS

FIG. 2b is a schematic diagram of a level change of an internal signal of the electronic device in FIG. 2a;

FIG. 3b is a schematic diagram of changes in a first control signal n1 and a current I of a motor M in a working process of the brushless motor in FIG. 2a;

FIG. 3c(1) and FIG. 3c(2) are a schematic diagram of current transmission paths of a drive control apparatus 202 for a brushless motor in a period t1;

DESCRIPTION OF EMBODIMENTS

Figure 1A:
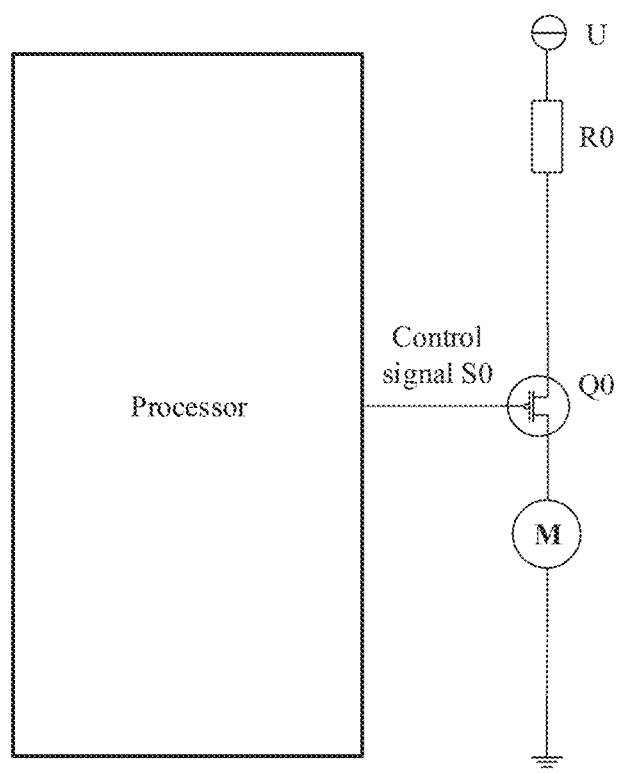
FIG. 1a is a schematic diagram 1 of a structure of an electronic device.

The terms "first", "second", "third", and the like in the specification, claims, and accompanying drawings of this application are used to distinguish between different objects, but are not used to limit a specific sequence.

In embodiments of this application, words such as "example" or "for example" are used to represent giving examples, illustrations, or descriptions. Any embodiment or design solution described as "example" or "for example" in embodiments of this application should not be construed as being more preferred or advantageous than other embodiments or design solutions. Specifically, the words such as "example" or "for example" are used to present related concepts in a specific manner.

For ease of understanding, related technical principles in embodiments of this application are described herein in embodiments of this application.

(1) A brushless motor may also be referred to as a brushless direct current motor. The brushless direct current motor includes a motor body and a driver, and is a typical electromechanical product. The brushless direct current motor includes a permanent magnet rotor, a multi-pole winding stator, a position sensor, and the like, and is widely used in mobile phones, high-end tape decks, video recorders, electronic instruments, and automatic office equipment.

(2) A characteristic of an inductor is that a current passing through the inductor cannot abruptly change. When the current in the inductor changes, a self-induced electromotive force is generated at two ends of the inductor, to prevent the change of the current. If there is no current passing through the inductor, when a circuit is connected, the inductor attempts to prevent a current from flowing through the inductor. If there is a current passing through the inductor, when a circuit is disconnected, the inductor attempts to maintain the current unchanged. The inductor is an element that can convert electric energy into magnetic energy for storage. Windings, coils, and the like may all be understood as inductors.

(3) If a voltage between a gate and a source, that is, a gate-source voltage VGS, of a PMOS transistor is more negative, on resistance of a channel is smaller, and a value of a current is larger. When the gate-source voltage VGS is less than a turn-on voltage, the PMOS transistor is conducted. When the gate-source voltage VGS is greater than or equal to the turn-on voltage, the PMOS transistor is cut off.

(4) If a voltage between a gate and a source, that is, a gate-source voltage VGS, of an NMOS transistor is more positive, on resistance of a channel is smaller, and a value of a current is larger. When the gate-source voltage VGS is greater than a turn-on voltage, the NMOS transistor is conducted. When the gate-source voltage VGS is less than or equal to the turn-on voltage, the NMOS transistor is cut off.

For clarity and brevity of the following embodiments, a brief description of a drive control solution for a brushless motor is first provided.

Using a mobile phone as an example, the mobile phone implements a vibration function of the mobile phone by controlling start and stop of a brushless motor. Specifically, when the mobile phone needs to generate vibration, a processor in the mobile phone controls, by using a control signal, the brushless motor to be turned on. When the brushless motor is turned on, rotation of a rotor in the brushless motor generates vibration, so that the mobile phone generates vibration. When the mobile phone needs to stop vibrating, the processor in the mobile phone controls, by using a control signal, the brushless motor to be turned off, the rotor of the brushless motor stops rotating, and the mobile phone stops vibrating.

A schematic diagram of a structure of the mobile phone may be shown in FIG. 1a. The processor is connected to a drive control circuit for the brushless motor, and the processor sends a control signal S0 to a control end of a PMOS transistor Q0, to control conduction and cut-off of Q0. When Q0 is conducted, a branch on which a power supply U, a resistor R0, the PMOS transistor Q0, and the brushless motor M are located is connected, the power supply U supplies power to the brushless motor M, a current flows through the brushless motor M, and the rotor in the brushless motor M rotates to generate vibration. When a control signal controls Q0 to be cut off, the branch on which the power supply U, the resistor R0, the PMOS transistor Q0, and the brushless motor M are located is disconnected, the power supply U no longer supplies power to the brushless motor M, the current inside the brushless motor M gradually disappears, and the rotor of the brushless motor stops rotating and no longer generates vibration.

Figure 1B:
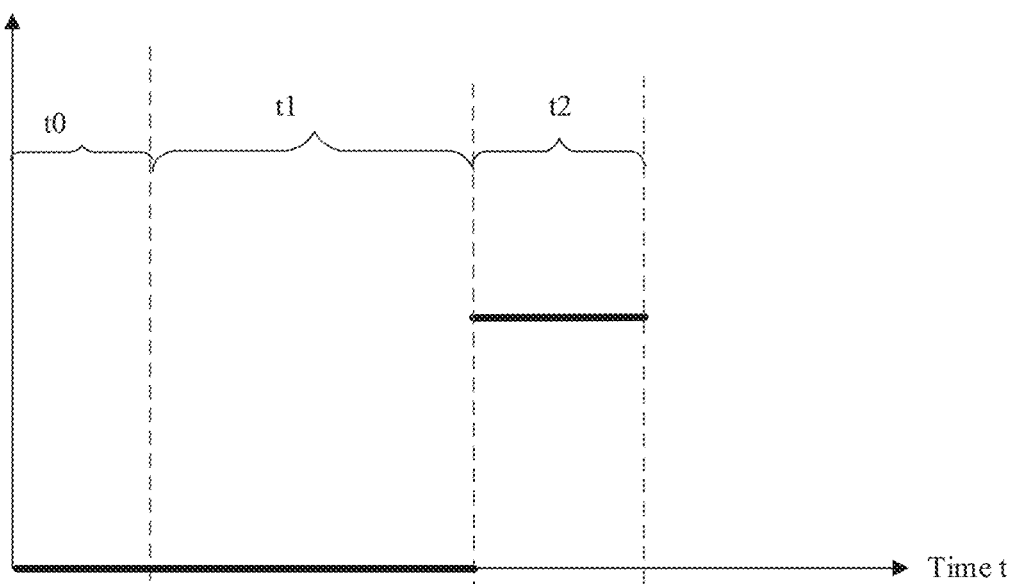
FIG. 1b is a schematic diagram of changes in a control signal S0 and a current I of a motor in a working process of the brushless motor.
Figure 1B:
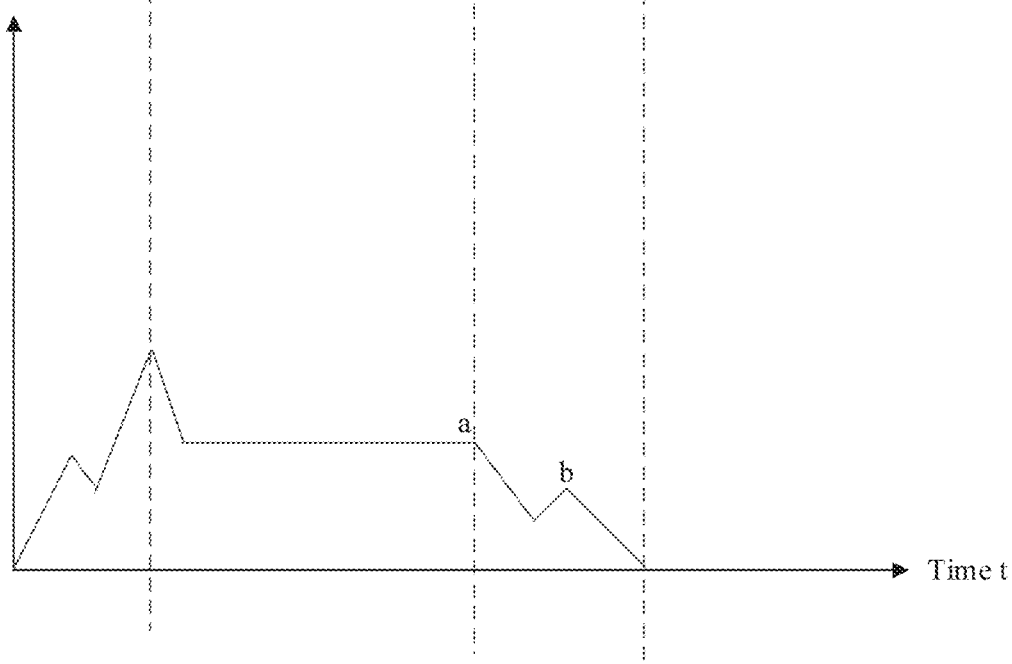

Specifically, a vibration process of the mobile phone is described with reference to FIG. 1a and FIG. 1b. When the mobile phone needs to vibrate, the brushless motor M is controlled to be turned on. In a turn-on period t0 of the brushless motor M, the processor outputs a control signal S0 in a low-level state. Q0 shown in FIG. 1a is conducted in the period t0. In this case, as shown in FIG. 1b, a current I inside the brushless motor M gradually increases. After the period t0, the current I inside the brushless motor M reaches a turn-on current, the brushless motor M is turned on, and the rotor of the brushless motor M starts to rotate. In a stable working period t1 of the brushless motor M, the control signal SO output by the processor continues to be in the low-level state, the current I inside the brushless motor M is gradually stabilized, and then the brushless motor M stably generates vibration.

When the mobile phone needs to stop vibrating, for example, as shown in FIG. 1b, the control signal S0 is at a high level in a turn-off period 2, Q0 shown in FIG. 1a is cut off in the period t2, and the power supply U no longer supplies power to the brushless motor M.

However, continuing to refer to FIG. 1b, it can be learned that in the turn-off period t2, the current I in the brushless motor M does not immediately change to 0 after the power supply U stops supplying power to the brushless motor M. The brushless motor M has a winding. It can be learned from the foregoing technical principle description that the winding has a characteristic of preventing a current change. If there is originally a current that passes through, when a circuit is suddenly disconnected, the winding attempts to maintain the current unchanged. Therefore, in the period t2, the current in the brushless motor M does not decrease to 0 at once. As shown in a section ab in FIG. 1b, the current in the brushless motor M first decreases and then increases, and an inductor in the brushless motor M attempts to maintain the original current I unchanged. Therefore, a turn-off response time (that is, the turn-off period t2) of the brushless motor M is relatively long, and the brushless motor M cannot be quickly turned off, that is, vibration of the mobile phone cannot be quickly stopped.

Figure 1C:
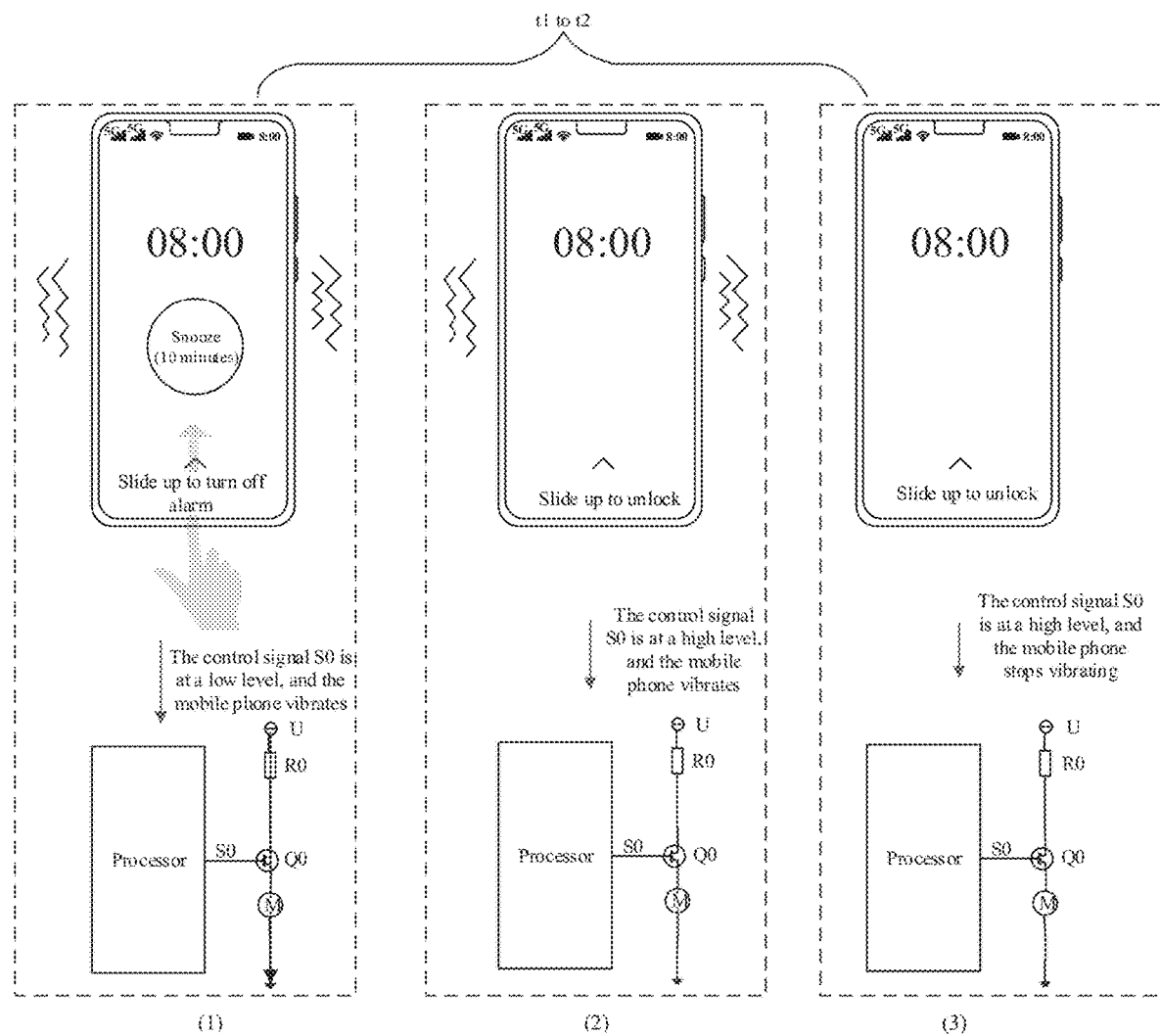
FIG. 1c is a schematic diagram of a process of disabling a vibration prompt of an alarm clock.

The following uses a vibration alert scenario of an alarm clock of the mobile phone as an example for description. Referring to FIG. 1c, when an alarm clock set by a user for 8.00 rings, as shown in (1) in FIG. 1c, in the period t1, the mobile phone is vibrating, and a mobile phone interface prompts the user to select "Snooze (10 minutes)" or "Slide up to turn off alarm". In this case, the control signal S0 sent by the processor in the mobile phone is at a low level, Q0 is conducted, a flowing direction of a current in the circuit is shown by a thick solid-line arrow in (1) in FIG. 1c, and the current flows out from the power supply U and sequentially passes through the resistor R0, the MOS transistor Q0, and the brushless motor M. The current flows through the brushless motor M, and the brushless motor M is turned on and works stably, so that vibration is generated. Continuing to refer to (1) in FIG. 1c, after the user performs, in the mobile phone interface, an operation of sliding up to turn off the alarm, the period t2 starts, and the mobile phone interface changes to (2) in FIG. 1c. In this case, the mobile phone interface no longer prompts that the alarm clock rings, and the control signal S0 output by the processor in the mobile phone changes to a high level. However, as shown by a thick solid-line arrow in (2) in FIG. 1c, because of a characteristic of the inductor in the brushless motor M, the current is maintained unchanged in the brushless motor M after the circuit is disconnected. Therefore, there is still a current in the brushless motor M. Therefore, as shown in (2) in FIG. 1c, the mobile phone is still in a vibrating state. Referring to (3) in FIG. 1c, the control signal S0 is always at the high level and Q0 is always in a cut-off state. Therefore, without power supplied by the power supply U, energy in the brushless motor M gradually disappears, and no current passes through the brushless motor M. In this case, the mobile phone completely stops vibrating.

It can be learned from the description in FIG. 1c that, the mobile phone does not stop vibrating immediately after the user performs the operation to turn off the alarm clock. There is a time interval (that is, the turn-off period t2) between a moment at which the user performs the operation to turn off the alarm clock and a moment at which the brushless motor M is completely turned off. In other words, a turn-off response time of the brushless motor is relatively long, and the brushless motor cannot be quickly turned off. Consequently, power consumption in a process of turning off the motor is relatively high.

The brushless motor may be actually understood as a component made by using a brushless motor. The brushless motor may be applied to components such as a brushless motor, a solenoid valve, and a gradient valve. It is found through research that a drive control solution for components such as a solenoid valve and a gradient valve is similar to the foregoing drive control solution for the brushless motor, turn-on and turn-off are also controlled by using a control signal, and there is also a problem that a turn-off period is too long and running of a motor cannot be quickly stopped.

Based on the problem in the foregoing technical solutions, this application provides a drive control apparatus for a brushless motor and a related device, to accelerate energy consumption of a brushless motor by using a discharge circuit after a circuit is disconnected, so that running of the brushless motor can be quickly stopped.

The following describes embodiments of this application with reference to FIG. 2a to FIG. 3e.

Specifically, an embodiment of this application discloses an electronic device. The electronic device may be a mobile phone, a tablet computer, a desktop computer, a laptop computer, a notebook computer, an ultra-mobile personal computer (Ultra-mobile Personal Computer, UMPC), a handheld computer, a netbook, a personal digital assistant (Personal Digital Assistant, PDA), a wearable electronic device, a smart watch, or the like. The electronic device has a brushless motor, and can implement stable working of the brushless motor. Different electronic devices may implement different functions by controlling running of brushless motors, for example, may implement a vibration function, a valve function, and the like.

For ease of description, an example in which the electronic device is a mobile phone and the brushless motor is specifically a brushless motor is used for description below.

Figure 2A:
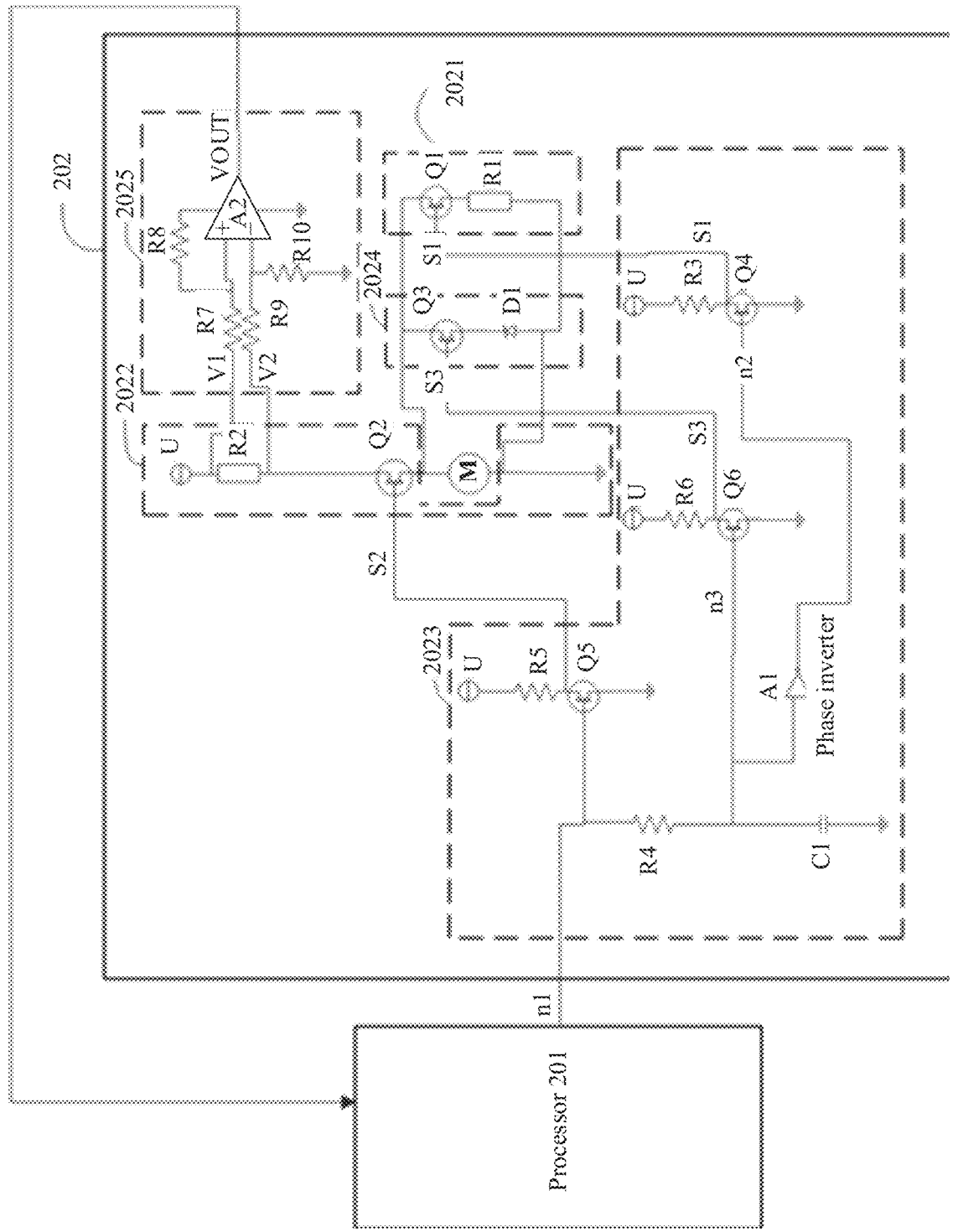
FIG. 2a is a schematic diagram 2 of a structure of an electronic device.

FIG. 2a is a schematic diagram 1 of a structure of an electronic device according to an embodiment of this application. FIG. 2a includes a processor 210 and a drive control apparatus 202 for a brushless motor. The drive control apparatus 202 for the brushless motor includes a discharge circuit 2021, a motor drive circuit 2022, a control circuit 2023, a freewheeling circuit 2024, and a current monitoring circuit 2025.

The processor 201 is mainly configured to execute an instruction according to an execution sequence and an execution time that are specified by a program, and perform arithmetic operation and logical operation on data. In this embodiment of this application, the processor 201 is configured to output a first control signal n1, and the first control signal n1 is used to control working states such as turn-on, stable running, and turn-off of the brushless motor M. In some embodiments, n1 may be a pulse width modulation signal, and the processor may control turn-on, stable running, and turn-off of the brushless motor M by outputting signals n1 with different duty cycles and different level states. In this embodiment of this application, the processor 201 is further configured to collect a second monitoring voltage Vout, and calculate a current I of the brushless motor based on a value of the second monitoring voltage Vout. The processor 201 may control a working status of the brushless motor M based on the current I of the brushless motor. For example, when a value of the current I of the brushless motor M is excessively large and exceeds a specified threshold, the brushless motor M may be controlled to be turned off to enter a turn-off period, or a duty cycle of the signal n1 may be reduced, to protect the brushless motor. In some other embodiments, the processor 201 may not collect the second monitoring voltage Vout, that is, the current of the brushless motor M may not be monitored. In some embodiments, the processor 210 may include one or more processing units. For example, the processor 210 may include an application processor (application processor, AP), a modem processor, a graphics processing unit (graphics processing unit, GPU), an image signal processor (image signal processor, ISP), a controller, a video codec, a digital signal processor (digital signal processor, DSP), a baseband processor, and/or a neural-network processing unit (neural-network processing unit, NPU). Different processing units may be independent components, or may be integrated into one or more processors. A memory may further be disposed in the processor 210, to store instructions and data.

The drive control apparatus 202 for the brushless motor includes a discharge circuit 2021, a motor drive circuit 2022, a drive signal generation circuit 2023, a freewheeling circuit 2024, and a current monitoring circuit 2025.

The discharge circuit 2021 is connected to the brushless motor M and the motor drive circuit 2022, and the motor drive circuit 2022 is connected to the brushless motor M. The current monitoring circuit 2025 is connected to the processor 201 and the motor drive circuit 2022. The drive signal generation circuit 2023 is connected to the processor 201, the discharge circuit 2021, the motor drive circuit 2022, and the freewheeling circuit 2024.

The discharge circuit 2021 includes a first MOS transistor Q1 and a first resistor R1. A first end of the first MOS transistor Q1 is connected to one end of the first resistor, a second end of the first MOS transistor Q1 is connected to a first end of the brushless motor M, and a control end of Q1 receives a first drive signal S1. The other end of the first resistor R1 is connected to a second end of the brushless motor M, and a common end between the first resistor R1 and the brushless motor M is grounded.

The first drive signal S1 is used to control conduction/cut-off of the first MOS transistor Q1.

The motor drive circuit 2022 includes a second MOS transistor Q2 and a second resistor R2. A first end of the second MOS transistor Q2 is connected to one end of the second resistor R2, a second end of the second MOS transistor is connected to the first end of the brushless motor M. and a control end of the second MOS transistor Q2 receives a second drive signal S2. The second end of the brushless motor M is grounded. The other end of the second resistor R2 receives a supply voltage U.

The second drive signal S2 is used to control conduction/cut-off of the second MOS transistor Q2.

The drive signal generation circuit 2023 includes a third resistor R3, a fourth resistor R4, a fifth resistor R5, a sixth resistor R6, a fourth MOS transistor Q4, a fifth MOS transistor Q5, a sixth MOS transistor Q6, a phase inverter A1, and a first capacitor C1. One end of the third resistor R3 receives the supply voltage U, the other end of the third resistor R3 is connected to a second end of the fourth MOS transistor Q4, and a first end of the fourth MOS transistor Q4 is grounded. A control end of the fourth MOS transistor Q4 receives a second control signal n2. One end of the fifth resistor R5 receives the supply voltage U, the other end of the fifth resistor R5 is connected to a second end of the fifth MOS transistor Q5, and a first end of the fifth MOS transistor Q5 is grounded. A control end of the fifth MOS transistor Q5 receives the first control signal n1. One end of the fourth resistor R4 receives the first control signal n1, the other end of the fourth resistor R4 is connected to one end of the first capacitor C1, and the other end of the first capacitor C1 is grounded. A common end between the fourth resistor R4 and the first capacitor C1 outputs a third control signal n3. An input end of the phase inverter A1 receives the third control signal n3, and an output end of the phase inverter A1 outputs the second control signal n2. One end of the sixth resistor R6 receives the supply voltage, the other end of the sixth resistor R6 is connected to a second end of the sixth MOS transistor Q6, and a first end of the sixth MOS transistor Q6 is grounded.

A common end between the third resistor and the fourth switching transistor outputs the first drive signal S1. A common end between the sixth resistor R6 and the sixth MOS transistor Q6 outputs a third drive signal S3, and a common end between the fifth MOS transistor Q5 and the fifth resistor R5 outputs the second drive signal S2.

The first control signal n1 is used to control conduction/cut-off of the fifth MOS transistor Q5, the second control signal n2 is used to control conduction/cut-off of the fourth MOS transistor Q4, and the third control signal n3 is used to control conduction/cut-off of the sixth MOS transistor Q6.

The freewheeling circuit 2024 includes a third MOS transistor Q3 and a diode D1. A first end of the third MOS transistor Q3 is connected to a cathode of the diode, and a second end of the third MOS transistor Q3 is connected to the first end of the brushless motor M. A control end of the third MOS transistor Q3 receives the third drive signal S3. An anode of the diode D1 is connected to the second end of the brushless motor M, and a common end between the diode D1 and the brushless motor M is grounded.

The third drive signal S3 is used to control conduction/cut-off of the third MOS transistor Q3.

The current monitoring circuit 2025 includes a seventh resistor R7, an eighth resistor R8, a ninth resistor R9, a tenth resistor R10, and an operational amplifier A2. One end of the seventh resistor R7 receives a first voltage V1, the other end of the seventh resistor R7 is connected to an in-phase input end of the operational amplifier A2, one end of the eighth resistor R8 is connected to the in-phase input end of the operational amplifier A2, and the other end of the eighth resistor R8 is connected to a positive power end of the operational amplifier A2. One end of the ninth resistor R9 receives a second voltage V2, and the other end of the ninth resistor R9 is connected to an inverting input end of the operational amplifier A2. One end of the tenth resistor R10 is connected to the inverting input end of the operational amplifier A2, and the other end of the tenth resistor R10 is grounded. A negative power end of the operational amplifier A2 is grounded. An output end of the operational amplifier A2 outputs the second monitoring voltage Vout. A difference between the first voltage V1 and the second voltage V2, that is, a voltage V1-V2 between the seventh resistor R7 and the ninth resistor R9, is referred to as a first monitoring voltage.

In this embodiment of this application, the operational amplifier A2 is configured to amplify a value of the first monitoring voltage by a multiple of $$\frac{R8}{R7},$$

to obtain and output the amplified second monitoring voltage Vout. In the embodiment shown in FIG. 2a, the first voltage V1 is the supply voltage U. In some other embodiments, the first voltage V1 may not be equal to the supply voltage U. A magnification of the operational amplifier A2 may be adjusted by adjusting values of R7 and R8. Specifically, the second monitoring voltage is $$Vout = \frac{R8}{R7} \times (V1 - V2).$$

In this embodiment of this application, the current of the brushless motor is $$I = \frac{V1 - V2}{R2}.$$

Therefore, the current of the brushless motor is $$I = Vout \times \frac{R7}{R8 \times R2}.$$

In this embodiment of this application, the processor 201 collects the value of Vout, and may calculate the monitored current I by using values of Vout, R7, R8, and R2. In some other embodiments, if the processor 201 does not need to monitor the current I of the brushless motor M, the drive control apparatus 202 for the brushless motor may have no current monitoring circuit 2025.

It should be noted that, referring to FIG. 2a, Q1, Q2, and Q3 are PMOS transistors, and Q4, Q5, and Q6 are NMOS transistors. A first end of an MOS transistor mentioned in FIG. 2a may refer to a source of the MOS transistor, a second end of the MOS transistor may refer to a drain of the MOS transistor, and a control end of the MOS transistor refers to a gate of the MOS transistor. It can be learned from the foregoing description that the MOS transistor in this embodiment of this application mainly functions as a switch. Therefore, in some other embodiments, the MOS transistor in FIG. 2a may alternatively be a switching transistor whose conduction/cut-off can be controlled, for example, a relay or a transistor.

It should be further noted that, in some embodiments, the control apparatus 202 for the brushless motor may be integrated into one or more chips and placed in the electronic device. For example, the discharge circuit 2021, the motor drive circuit 2022, the drive signal generation circuit 2023, the freewheeling circuit 2024, and the current monitoring circuit 2025 may be separately integrated into chips.

Specifically, the following separately describes internal running statuses of the electronic device shown in FIG. 2a in a turn-on period t0, a stable working period t1, and a turn-off period t2 of the brushless motor.

(1) Turn-on Period t0 of the Brushless Motor M

Figure 2B:
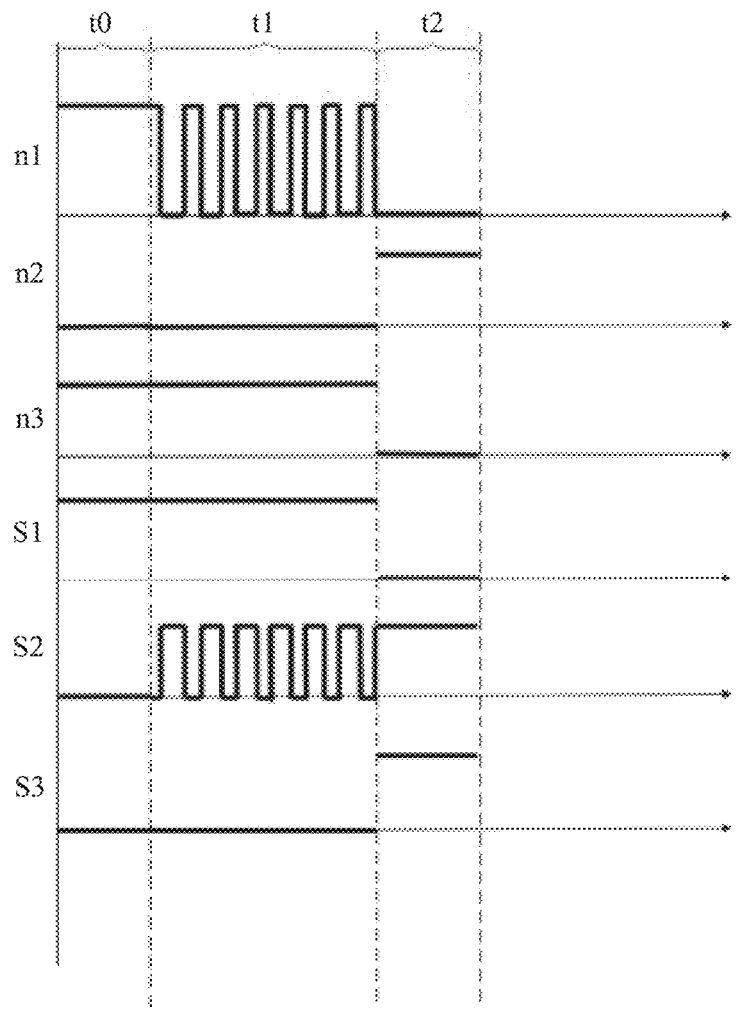

In the turn-on period t0 of the brushless motor M, the first control signal n1 output by the processor 201 may be shown in FIG. 2b. In the period t0, the first control signal n1 output by the processor 201 is at a high level, and the processor 201 outputs the first control signal n1 in a high-level state to the control apparatus 202 for the brushless motor, to control the brushless motor M to be turned on. A trigger manner in which the processor 201 generates the first control signal in the period t0 may be triggering by ringing of an alarm clock, triggering by a special effect in a game process of a user, or the like.

This embodiment of this application sets no limitation on a manner of triggering generation of the first control signal n1 in the period t0, provided that the processor 201 generates, in the period t0, the first control signal n1 that can be used to turn on the brushless motor M. Duration of the period t0 may be set by the processor. In some embodiments, duration required for completely turning on the brushless motor M may be determined through experiment, and then the duration is set to duration of t0. A manner of setting a value of t0 is not limited in this embodiment of this application.

Referring to FIG. 2b, in the turn-on period t0, the first control signal n1 and the third control signal n3 in the electronic device shown in FIG. 2a are in a high-level state, and the second control signal n2 is in a low-level state. The first drive signal S1 is in a high-level state, and the second drive signal S2 and the third drive signal S3 are in a low-level state.

Figure 3A:
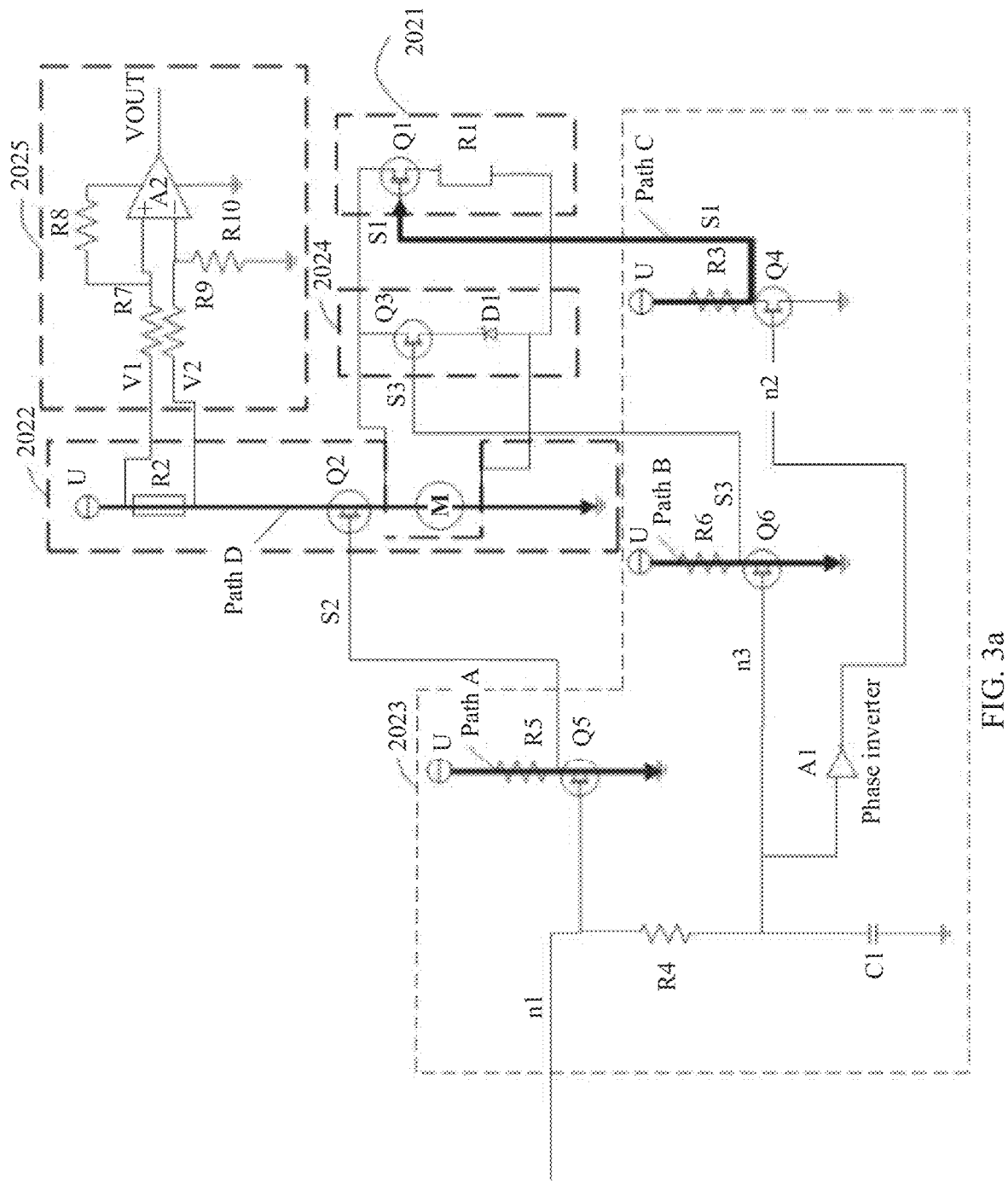
FIG. 3a is a schematic diagram of current transmission paths of a drive control apparatus 202 for a brushless motor in a period t0.

Specifically, the following describes a working process of the control apparatus 202 for the brushless motor in the turn-on period t0 by using FIG. 3a.

1. Working Process of the Drive Signal Generation Circuit 2023 in the Period t0

For the drive signal generation circuit 2023, in the period t0, the control end of the fifth MOS transistor Q5 receives the first control signal n1 at the high level, and Q5 is in a conducted state. As shown by a path A in FIG. 3a, after Q5 is conducted, a current flows from a power supply to the ground through R5 and Q5. Therefore, the second drive signal S2 output by the common end between R5 and Q5 is at a low level.

After flowing through R4 and C1, the first control signal n1 undergoes filtering and rectification processing performed by R4 and C1, and the third control signal n3 in a high-level state is generated at the common end between R4 and C. The control end of the sixth MOS transistor Q6 receives the third control signal n3, and Q6 is in a conducted state under control of n3 at a high level Therefore, as shown by a path B in FIG. 3a, a current flows from the power supply U to the ground through R6 and Q6. Therefore, the third drive signal S3 output by the common end between R6 and Q6 is at a low level.

The third control signal n3 is input to the phase inverter A1, and the phase inverter A1 obtains and outputs the second control signal n2 that is inverted to the third control signal n3. Because the third control signal n3 is in a high-level state, the second control signal n2 is in a low-level state. The control end of the fourth MOS transistor Q4 receives the second control signal n2, and Q4 is in a cut-off state under control of the second control signal n2 in the low-level state. Therefore, as shown by a path C in FIG. 3a, a current is output from the power supply U, and does not flow through Q3 after passing through R3, but is directly output to the discharge circuit 2021. Therefore, the first drive signal S1 output by the common end between R3 and Q3 is in a high-level state.

2. Working Process of the Motor Drive Circuit 2022 in the Period t0

It can be learned from the foregoing working process of the drive signal generation circuit 2023 in the period t0 that the drive signal generation circuit 2023 outputs the second drive signal S2 in the low-level state in the period t0, the control end of the second MOS transistor Q2 receives S2, and Q2 is in a conducted state under control of S2 in the low-level state. Therefore, as shown by a path D in FIG. 3a, a current is output from the power supply and flows through R2, Q2, and M to the ground. In this case, because the power supply supplies power to the brushless motor M, a current starts to exist in the brushless motor M. Therefore, the brushless motor M starts to be turned on. Because there is a current in a branch in which the brushless motor M is located, the first voltage V1 and the second voltage V2 are separately output at two ends of the second resistor R2, and a voltage between the two ends of the second resistor R2 is the first monitoring voltage V1−V2, where V1−V2=I×R2. I is the current in the brushless motor M. Because the value of the first monitoring voltage is proportional to the current in the brushless motor M, the first monitoring voltage can reflect the current in the brushless motor M within t0. In the branch in which the brushless motor M is located, it may be considered that R2 and M divide the supply voltage U. Therefore, in this case, a voltage Um between two ends of the brushless motor M may be considered to be equal to U−(V1−V2).

Figure 3B:
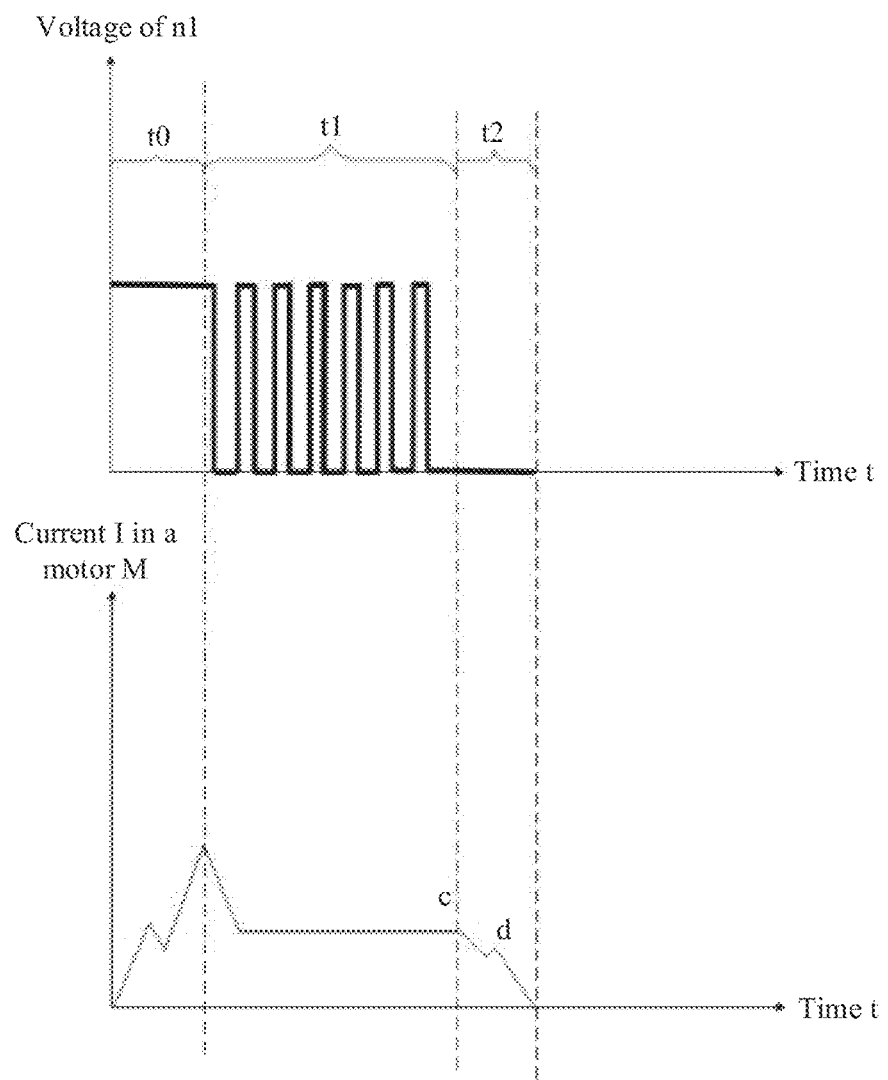

Referring to FIG. 3b, in the period t0, a value of the current I in the brushless motor M gradually increases. Because there is a winding in the brushless motor M, due to impact of a characteristic of an inductor, the brushless motor M prevents a current change. Therefore, in the period t0, the current in the brushless motor M decreases and then continues to increase. To shorten the turn-on period t0 of the brushless motor M, the voltage Um provided by the supply voltage U for the brushless motor M in the period t0 may be increased by increasing a value of the supply voltage U or by reducing a value of R2 to reduce a voltage obtained by R2 from the supply voltage U, so that a value of Um is greater than or equal to a turn-on voltage of the brushless motor M. In other words, an overvoltage turn-on voltage is provided for the brushless motor M, so that the brushless motor M is turned on in an overvoltage manner. In an overvoltage turn-on state, duration t0 for completing turn-on of the brushless motor M decreases. Overvoltage refers to exceeding a stable working voltage of the brushless motor M. Because duration of the turn-on period t0 is relatively short, even if the brushless motor M is in the overvoltage turn-on state in a short time period, the motor is not affected, and a time required for turning on the brushless motor M can be reduced.

3. Working Process of the Discharge Circuit 2021 in the Period t0

It can be learned from the foregoing working process of the drive signal generation circuit 2023 in the period t0 that the first drive signal S1 output by the drive signal generation circuit in the period t0 is at a high level. The first MOS transistor Q1 is in a cut-off state under control of S1 in a high-level state. Therefore, no current flows through a branch in which Q1 and R1 are located. The entire discharge circuit is not in a working state in the period t0.

4. Working Process of the Freewheeling Circuit 2024 in the Period t0

It can be learned from the foregoing working process of the drive signal generation circuit 2023 in the period t0 that the third drive signal S3 output by the drive signal generation circuit in the period t0 is a low-level signal. Therefore, Q3 is in a conducted state under control of the third drive signal S3 at a low level. However, because a branch in which Q3 and D1 are located is connected to two sides of the brushless motor M in parallel, it is equivalent to that the brushless motor M applies a reverse voltage to the diode D1, and the diode D1 is cut off. Therefore, there is no current in the branch in which Q3 and D1 are located, and the freewheeling circuit 2024 does not work in the period t0.

5. Working Process of the Current Monitoring Circuit 2025 in the Period t0

It can be learned from the foregoing working process of the motor drive circuit 2022 in the period t0 that the motor drive circuit 2022 outputs the first monitoring voltage to the current monitoring circuit 2025 in the period t0. It can be learned from the foregoing description of the current monitoring circuit 2025 in FIG. 2a that the current monitoring circuit 2025 may amplify the first monitoring voltage to obtain and output the second monitoring voltage Vout, and the value of Vout can be used to calculate the current I in the brushless motor.

The current monitoring circuit 2025 may output the second monitoring voltage Vout to the processor 201, so that the processor monitors the current I in the brushless motor in the period t0.

It can be learned from the foregoing description of the working process of the electronic device in FIG. 2a in the period t0 that, in the period t0, the processor 201 outputs the first control signal n1 to the drive signal generation circuit 2023, so that the drive signal generation circuit 2023 obtains and outputs the first drive signal S1, the second drive signal S2, and the third drive signal S3. Then, after receiving the second drive signal S2, the motor drive circuit 2022 turns on the brushless motor M and outputs the first monitoring voltage. The freewheeling circuit 2024 does not work under control of the third drive signal S3, and the discharge circuit 2021 does not work under control of the first drive signal S1. The current monitoring circuit 2025 amplifies the received first monitoring voltage to obtain and output the second monitoring voltage Vout. The second monitoring voltage Vout is output to the processor 201. The processor 201 obtains the current I in the brushless motor M by using the second monitoring voltage Vout, to monitor the current I in the brushless motor M in the period t0.

(2) Stable Working Period t1 of the Brushless Motor M

In the stable working period t1 of the brushless motor M, the first control signal n1 output by the processor 201 may be shown in FIG. 2b. In the period t1, the first control signal n1 output by the processor 201 may be a pulse width modulation (Pulse width modulation, PWM) signal whose duty cycle is k. For example, a value of k may be 20% to 80%. The processor 201 outputs the first control signal n1 in a PWM form to the control apparatus 202 for the brushless motor, to control the brushless motor M to work stably. A type of the first control signal n1 generated by the processor 201 in the period t11 is preset by using a program. For example, it is specified that a first control signal n1 whose duty cycle is 50% and that is in a PWM form is output in the period t1.

This embodiment of this application sets no limitation on a manner in which the processor 201 triggers to enter the period t1 and a manner in which the processor 201 triggers to end the period t1. For example, it may be specified that the processor 201 automatically triggers to enter the period t1 after the period t0 ends, and outputs a first control signal n1 that matches the period t1, and then the processor 201 ends the period t1 after receiving an operation instruction triggered by the user. For example, when the user triggers to disable a vibration prompt, the processor ends the period t1, starts control in the period t2, and outputs a first control signal n1 that matches the period t2.

In some other embodiments, the first control signal n1 output by the processor 201 in the period t1 may be different from that in FIG. 2b. For example, a first control signal n1 in a high-level state may be output in the period t1. The first control signal n1 output by the processor 201 in the period t1 may have many specific level states. This is not limited in this embodiment of this application, provided that the first control signal n1 output by the processor 201 in the period t1 can control the brushless motor M in the control apparatus 202 for the brushless motor to enter a stable working state.

Referring to FIG. 2b, in the stable working period t1, the first control signal n1 in the electronic device shown in FIG. 2a is a PWM signal, the second control signal n2 is a low-level signal, the third control signal n3 is a high-level signal, the first drive signal S1 is a high-level signal, the second drive signal S2 is a PWM signal inverted to the first control signal n1, and the third drive signal S3 is a low-level signal.

Specifically, the following describes a working process of the control apparatus 202 for the brushless motor in the stable working period t1 by using FIG. 3c(I) and FIG. 3c(2).

1. Working Process of the Drive Signal Generation Circuit 2023 in the Period t1

For the drive signal generation circuit 2023, in the period t1, the control end of the fifth MOS transistor Q5 receives the first control signal n1 in a PWM form, and Q5 is in a conducted state in a high-level period of the first control signal n1. As shown by a path E in FIG. 3c(1), when n1 is in a high-level state, Q5 is conducted, and a current is output from the power supply and flows through R5 and Q5 to the ground. Therefore, the second drive signal S2 output by the common end between R5 and Q5 is at a low level. As shown by a path F in FIG. 3c(2), when n1 is in a low-level state, Q5 is cut off, and after being output from the power supply, a current does not pass through Q5, but is directly output to the motor drive circuit 2022, that is, a second drive signal S2 in a high-level state is output. Therefore, in the period t1, when the first control signal n1 is at a high level, the output second drive signal S2 is at a low level, and a transmission path of a branch in which Q5 is located is shown as the path E in FIG. 3c(1). When n1 is at a low level, the output second drive signal S2 is at a high level, and a transmission path of a branch in which Q5 is located is shown as the path F in FIG. 3c(2). Therefore, the second drive signal S2 output by the drive signal generation circuit 2023 in the period t1 is equivalent to a PWM signal inverted to n1.

After flowing through R4 and C1, the first control signal n1 undergoes filtering and rectification processing performed by R4 and C1, and the third control signal n3 that is always in a high-level state is generated at the common end between R4 and C1. In other words, after rectification and filtering are performed on a PWM wave of the first control signal n1, regardless of a high-level state or a low-level state of n1, the obtained third control signal n3 is at a high level. As shown by a path G in FIG. 3c(1), in the period t1, when n1 is at a high level, n3 is also at a high level. Q6 is in a conducted state under control of n3 at the high level, and a current is output from the power supply and flows through R6 and Q6 to the ground. Therefore, the third drive signal S3 output by the common end between R6 and Q6 is a low-level signal. As shown in FIG. 3c(2), in the period t1, when n1 is at a low level, n3 is still at a high level. Therefore, a transmission path of a branch in which Q6 is located is still the path G, and the output third drive signal S3 is still a low-level signal.

In the period t1, the signal n1 is a PWM wave. Therefore, after rectification by R4 and C1, a voltage value of the obtained third control signal n3 that is always in a high-level state is less than that of n1. Further, a voltage value of a high level received by the control end of Q6 is small, voltage stress in the control apparatus 202 for the brushless motor is lower, and a life is longer.

The third control signal n3 is input to the phase inverter A1, and the phase inverter A1 obtains and outputs the second control signal n2 inverted to n3. Because n3 is at a high level in the period t1, n2 is at a low level. The control end of Q4 receives the signal n2, and Q4 is in a cut-off state under control of n2 at a low level. Therefore, in a path H shown in FIG. 3c(1), in the period t1, when n1 is at a high level, n2 is at a low level, and a current is output from the power supply, and does not pass through Q4 after flowing through R3, but is directly output to the discharge circuit 2021. The first drive signal S1 output by the common end between R3 and Q4 is at a high level. The first drive signal S1 output to the discharge circuit 2021 is at a high level. As shown in FIG. 3c(2), in the period t1, when n1 is at a low level, n2 is still at a low level. Therefore, a current transmission path of a branch in which Q4 is located is still the path H, that is, a first drive signal S1 at a high level is output.

2. Working Process of the Motor Drive Circuit 2022 in the Period t1

It can be learned from the foregoing working process of the drive signal generation circuit 2023 in the period t1 that, when n1 is at a high level, the second drive signal S2 output by the drive signal generation circuit is at a low level. Therefore, as shown in FIG. 3c(1), Q2 is in a conducted state under control of S2 at the low level. Therefore, a branch in which Q2 and the brushless motor M are located is connected. As shown in a path I, a current is output from the power supply, and flows through R2, Q2, and M to the ground. In this case, two ends of R2 output the first monitoring voltage to the current monitoring circuit 2025.

When n1 is at a low level, the second drive signal S2 is at a high level. Therefore, as shown in FIG. 3c(2). Q2 is in a cut-off state under control of S2 at the high level, a branch in which the brushless motor M is located has no power supply, and the two ends of R2 no longer output the first monitoring voltage to the current monitoring circuit 2025. The branch in which the brushless motor M is located should be disconnected, and no current flows through. However, the brushless motor M has an inductor characteristic, maintains an original current, and prevents a change in the current. Therefore, as shown in a path J, the brushless motor M generates an induced current to maintain an original current direction, and the brushless motor M can still work normally.

Specifically, referring to FIG. 3b, it can be learned that in the period t1, the current in the brushless motor M is gradually stabilized at a specific value, and the brushless motor M works stably at a stable current.

In the foregoing drive control solution for the brushless motor, as shown in FIG. 1b, a control signal S0 is in a low-level state in both a turn-on period and a stable working period. In this case, the brushless motor M in FIG. 1a is powered by the supply voltage U in both the turn-on period and the stable working period. Therefore, a value of the supply voltage U cannot be excessively large. Otherwise, the brushless motor M is in an overvoltage state in both the turn-on period and the stable working period, which easily causes damage to the brushless motor M. In this embodiment of this application, it can be learned from the working process of the motor drive circuit 2022 in the period t1 that the brushless motor M is not always powered by the power supply in the period t1. Therefore, the brushless motor M may be turned on in an overvoltage manner in the period t0, and the brushless motor M may be intermittently powered by the power supply in the period t1 under control of the signal n1 with a preset duty cycle, instead of being always powered by the power supply. This reduces power consumption of the brushless motor M, and saves energy.

3. Working Process of the Discharge Circuit 2021 in the Period t1

It can be learned from the foregoing working process of the drive signal generation circuit 2023 in the period t1 that the first drive signal S1 output by the drive signal generation circuit in the period t1 is always at a high level. The first MOS transistor Q1 is in a cut-off state under control of S1 in a high-level state. Therefore, no current flows through a branch in which Q1 and R1 are located. The entire discharge circuit is not in a working state in the period t0.

4. Working Process of the Freewheeling Circuit 2024 in the Period t1

It can be learned from the foregoing working process of the drive signal generation circuit 2023 in the period t1 that the third drive signal S3 output by the drive signal generation circuit in the period t1 is always a low-level signal. Therefore, in the period t1, Q3 is always in a conducted state under control of S3 at the low level.

As shown in FIG. 3c(1), according to the foregoing working process of the motor drive circuit 2022 in the period t1, when n1 is at a high level, as shown in a path I, a current is output from the power supply and flows through R2, Q2, and M to the ground. In this case, it is equivalent to that the brushless motor M applies a reverse voltage to the diode D1, and the diode D1 is cut off. Therefore, there is no current in the branch in which Q3 and D1 are located, and the freewheeling circuit 2024 does not work when n1 is at a high level.

According to the foregoing working process of the motor drive circuit 2022 in the period t1, when n1 is at a low level, as shown by a path J in FIG. 3c(2), the brushless motor M maintains an original current direction. In this case, an induced electromotive force generated by the brushless motor M due to an inductor characteristic is equivalent to a positive voltage applied to D1, and D1 is conducted. Because Q3 is also conducted, the current flows through D1 and Q3 from the brushless motor M, and then returns to the brushless motor M to form a path K, that is, the brushless motor M, D1, and Q3 form a loop. D1 performs freewheeling for the brushless motor M, so that the induced current generated by the brushless motor M is consumed in the loop in a freewheeling manner. This protects another component in the circuit from being damaged by the electromotive force generated by the brushless motor M. The brushless motor M can continue to work normally until energy is used up. When n1 changes to a high-level signal, the brushless motor M continues to work with power supply.

In some embodiments, the duty cycle of n1 may be set based on the turn-off response time of the brushless motor M. The turn-off response time of the brushless motor M refers to duration from a moment at which Q2 is cut off and the power supply no longer supplies power to the brushless motor M to a moment at which the brushless motor M stops running. When the duty cycle of n1 is set, low-level duration of n1 may be set to be less than the turn-off response time. Further, in the period t1, the brushless motor M can always maintain a running state.

In some embodiments, the first control signal n1 may alternatively be a signal that is always in a high-level state in the period t1. When n I is always in the high-level state, a current path formed in the control apparatus 202 for the brushless motor is always that shown in FIG. 3c(1). For details, refer to the description in FIG. 3c(1). Details are not described herein again.

5. Working Process of the Current Monitoring Circuit 2025 in the Period t1

It can be learned from the foregoing working process of the motor drive circuit 2022 in the period t1 that, when n1 is a high-level signal, the motor drive circuit 2022 outputs the first monitoring voltage to the current monitoring circuit 2025, and the current monitoring circuit 2025 may amplify the first monitoring voltage to obtain the second monitoring voltage Vout. For a specific process in which the current monitoring circuit obtains the second monitoring voltage, refer to the foregoing working process of the current monitoring circuit 2025 in the period t0. Details are not described herein again.

When n1 is a low-level signal, the motor drive circuit 2022 does not output the first monitoring voltage, the current monitoring circuit 2025 does not work, and the second monitoring voltage Vout is 0.

(3) Stable Working Period t2 of the Brushless Motor M

In the turn-off period t2 of the brushless motor M, the first control signal n2 output by the processor 201 may be shown in FIG. 2b, and is a low-level signal. Triggering the processor 201 to generate, in the period t2, the signal n1 that matches the period t2 may be preset by using the processor 201. For example, it is specified that after a turn-off operation instruction of the user is detected, the period t2 is entered, and the signal n1 that matches the period t2 is triggered to be generated. However, there are many manners for triggering the processor 201 to enter the period t2 and generate the signal n1 that matches the period t2. This is not limited in this embodiment of this application.

In some other embodiments, the first control signal n1 output by the processor 201 in the period t2 may be different from that in FIG. 2b. For example, a first control signal n1 in a high-level state may be output in the period 2. The first control signal n1 output by the processor 201 in the period t1 may have many specific level states. This is not limited in this embodiment of this application, provided that the first control signal n1 output by the processor 201 in the period t2 can control the brushless motor M in the control apparatus 202 for the brushless motor to enter a turn-off state.

Referring to FIG. 2b, in the turn-off period t2, the first control signal n1 in the electronic device shown in FIG. 2a is a low-level signal, the second control signal n2 is a high-level signal, the third control signal n3 is a low-level signal, the first drive signal S1 is a low-level signal, the second drive signal S2 is a high-level signal, and the third drive signal S3 is a high-level signal.

Figure 3D:
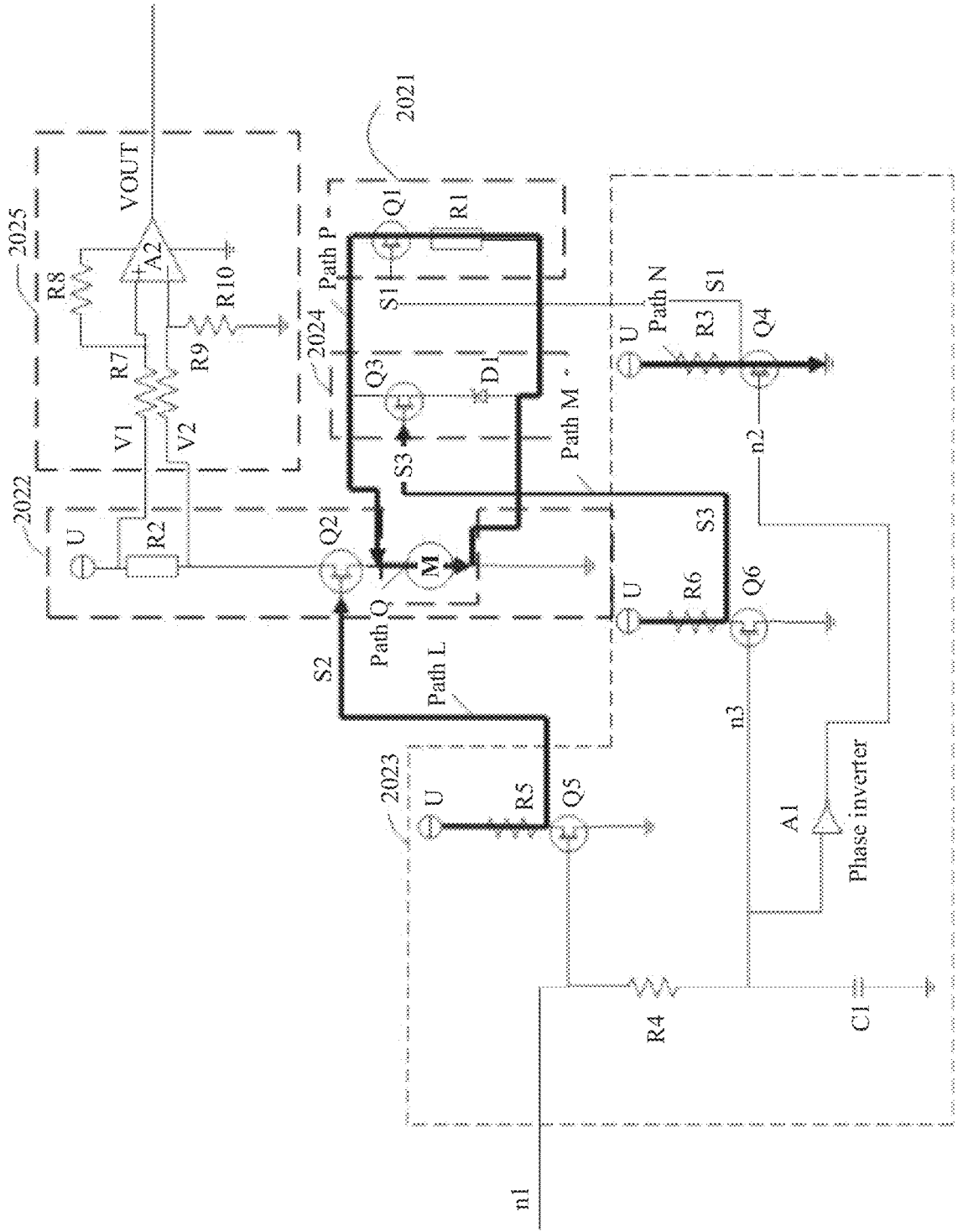
FIG. 3d is a schematic diagram of current transmission paths of a drive control apparatus 202 for a brushless motor in a period t2.
Figure 3E:
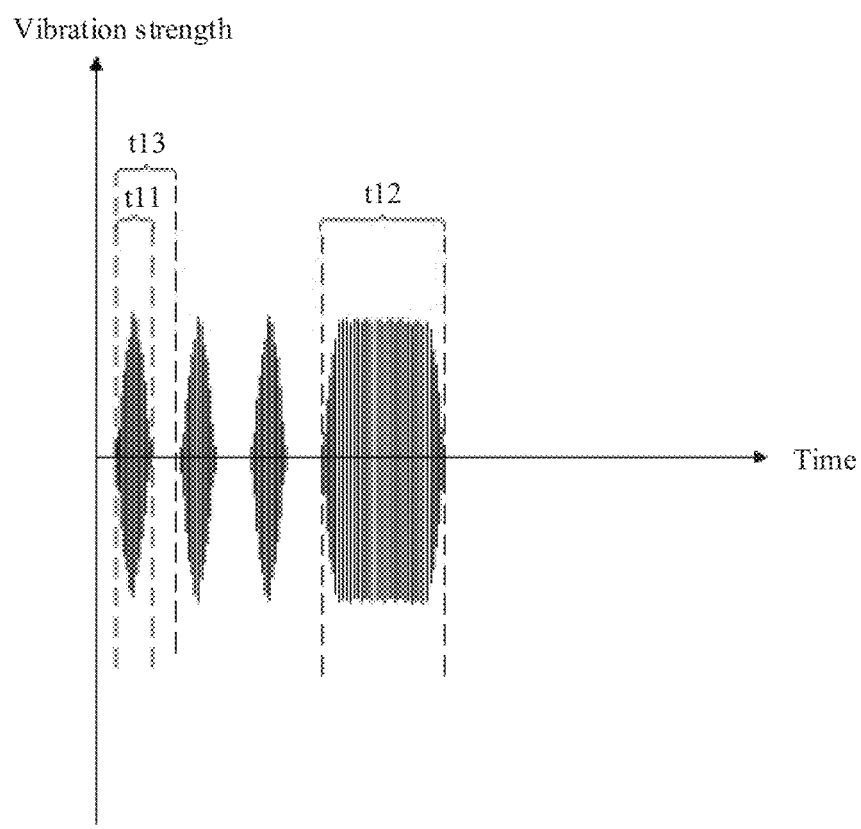
FIG. 3e is a schematic diagram of a change in vibration strength of a mobile phone.

Specifically, the following describes a working process of the control apparatus 202 for the brushless motor in the stable working period t2 by using FIG. 3d.

1. Working Process of the Drive Signal Generation Circuit 2023 in the Period t2

For the drive signal generation circuit 2023, in the period t2, the control end of Q5 receives the signal n1 in the low-level state, and Q5 is in a cut-off state under control of n1 at the low level. As shown by a path L in FIG. 3d, when n1 is in a low-level state, Q5 is cut off, and after being output from the power supply, a current does not pass through Q5, but is directly output to the motor drive circuit 2022 through R5, that is, a second drive signal S2 in a high-level state is output.

After the signal n1 is filtered and rectified by R4 and C1, a third control signal n3 output by the common end between R4 and C1 is a low-level signal, and Q6 is in a cut-off state under control of n3 at the low level. As shown by a path M in FIG. 3d, Q6 is cut off, and after being output from the power supply, a current does not pass through Q6, but is directly output to the freewheeling circuit 2024 through R6, that is, a third drive signal S3 in a high-level state is output.

After n3 is input to the phase inverter A1, a signal n2 that is inverted to n3 is obtained. Because n3 is at a low level, n2 is at a high level. Q4 is conducted under control of n2 at the high level. As shown by a path N in FIG. 3d, a current is output from the power supply and flows to the ground through R3 and Q4. Therefore, the first drive signal S1 output by the common end between R3 and Q4 is at a low level.

2. Working Process of the Motor Drive Circuit 2022 in the Period t2

It can be learned from the foregoing working process of the drive signal generation circuit 2023 in the period t2 that when n1 is at a low level, the second drive signal S2 output by the drive signal generation circuit is at a high level. Therefore, as shown in FIG. 3d, Q2 is cut off under control of S2 at the high level, a branch in which the brushless motor M is located has no power supply, and the two ends of R2 no longer output the first monitoring voltage to the current monitoring circuit 2025. The branch in which the brushless motor M is located should be disconnected, and no current flows through. However, the brushless motor M has an inductor characteristic, maintains an original current, and prevents a change in the current. Therefore, as shown in a path O, the brushless motor M maintains an original current direction, generates an induced current, and outputs the generated induced current to the discharge circuit 2021. The brushless motor M does not stop running immediately. The brushless motor M does not stop running until energy in the brushless motor M is completely consumed.

Specifically, referring to FIG. 3b, it can be learned that, in the period t2, the current in the brushless motor M does not directly change to 0, and due to impact of the inductor characteristic, the current in the brushless motor M transitorily increases in a section cd. The brushless motor M does not stop running and the current does not change to 0 until the energy in the brushless motor M is completely consumed.

3. Working Process of the Discharge Circuit 2021 in the Period t2

It can be learned from the foregoing working process of the drive signal generation circuit 2023 in the period t2 that the first drive signal S1 output by the drive signal generation circuit in the period t1 is always at a low level. The first MOS transistor Q1 is in a conducted state under control of S1 in a low-level state, and a current output by the brushless motor M may flow through a branch in which Q1 and R I are located, to form a path P. When the current passes through R1, power consumption is generated on R1, and energy consumption in the brushless motor M is accelerated, that is, the brushless motor M is discharged, so that the brushless motor M can quickly stop running. Specifically, if an equivalent inductance value of the brushless motor M is L, a discharge time of the brushless motor M is t=L/R1. R1 is equivalent to a discharge resistor. The induced current in the brushless motor applies work through R1, and R1 converts electric energy into internal energy, to quickly consume the electric energy of the brushless motor. In some other embodiments, another discharge component may be used to implement a discharge function, such as a bulb or a thermistor. The discharge component includes but is not limited to the content provided in embodiments of this application.

When a resistance value of R1 increases, power consumption of the resistor increases, energy consumption of the brushless motor M increases, the discharge time of the brushless motor M decreases, and duration corresponding to the section cd shown in FIG. 3b decreases. Therefore, duration of the entire period t2 decreases.

Compared with the foregoing drive control solution for the brushless motor, in this embodiment of this application, the discharge circuit 2021 discharges the brushless motor M in the turn-off period t2, to quickly stop the brushless motor. In this way, the brushless motor can stop running in a short period t2.

In this embodiment of this application, duration of the period t2 is shorter, so that the brushless motor M is applicable to more working frequencies, and modes at various working frequencies are applicable. Specifically, for example, referring to FIG. 3e, the brushless motor M in this embodiment of this application may work on a vibration band in t11 or a vibration band in t12. In this embodiment of this application, turn-on duration and turn-off duration of the brushless motor M are relatively short, and the brushless motor M can be quickly turned on and turned off. Therefore, in the same stable working period t1, the vibration bands t11 and t12 in this embodiment of this application are shorter, so that a time interval t13 between the vibration bands can be shorter, and can be applicable to a scenario at a relatively high working frequency. For example, in this embodiment of this application, the brushless motor in the mobile phone is quickly turned off, and this is applicable to a scenario in which the brushless motor in the mobile phone works at a vibration frequency of 100-150 Hz. Strong vibration at a low frequency can improve human ear comfort.

4. Working Process of the Freewheeling Circuit 2024 in the Period 2

It can be learned from the foregoing working process of the drive signal generation circuit 2023 in the period t2 that the third drive signal S3 output by the drive signal generation circuit in the period t2 is at a high level. Therefore. Q3 is in a cut-off state under control of S3 at the high level, and the freewheeling circuit does not work.

5. Working Process of the Current Monitoring Circuit 2025 in the Period t2

It can be learned from the foregoing working process of the motor drive circuit 2022 in the period t2 that the motor drive circuit 2022 does not output the first monitoring voltage to the current monitoring circuit 2025 in the period t2. Therefore, the current monitoring circuit 2025 does not work, and the second monitoring voltage Vout is 0.

A circuit structure of the drive signal generation circuit 2023 may have many types. In different circuit structures, specific processes of generating the first drive signal S1, the second drive signal S2, and the third drive signal S3 by using the first control signal n1 in different periods may be different. This is not limited in this embodiment of this application. In some other embodiments, all drive signals and control signals in this embodiment of this application may alternatively be generated by the processor 201, that is, the drive signal generation circuit 2023 may alternatively be a software logic circuit, and may be disposed in the processor 201.

An actual function of the freewheeling circuit 2024 is to perform freewheeling on the brushless motor M in the stable working period t1, to maintain running of the brushless motor M and protect components in the circuit. A circuit structure of the freewheeling circuit 2024 may have many types, including but not limited to the content provided in this application.

A function of the current monitoring circuit 2025 is to output the second monitoring voltage that can be used to reflect a current value of the brushless motor M to the processor 201, so that the processor 201 monitors the current value of the brushless motor M by receiving the second monitoring voltage. A circuit structure of the current monitoring circuit 2025 may have many types, including but not limited to the content provided in this application.

It can be learned from the foregoing description that, in this embodiment of this application, an actual function of the discharge circuit 2021 is to control to discharge the brushless motor M in the turn-off period t2, to accelerate energy consumption of the brushless motor M. Specifically, the drive signal generation circuit 2023 controls the discharge circuit 2021 to work in the period t2. The discharge circuit 2021 generates power consumption by receiving the induced current in the brushless motor M, to consume energy of the brushless motor M, reduce duration required for turning off the brushless motor M, and quickly turn off the brushless motor M. A circuit structure of the discharge circuit 2021 may have many types, including but not limited to the content provided in this application.

In conclusion, in this embodiment of this application, in the turn-on period t0 of the brushless motor M, the motor drive circuit 2022 continuously provides an overvoltage turn-on voltage for the brushless motor M under control of the second drive signal, so that the brushless motor M is turned on in an overvoltage manner, thereby shortening duration to required for turning on the brushless motor M, and achieving a quick turn-on effect In the stable working period t1 of the brushless motor M, when the second drive signal is in a first level state, for example, a low-level state, the motor drive circuit 2022 supplies power to the brushless motor under control of the second drive signal; or when the second drive signal is in a second level state, for example, a high-level state, power supply to the brushless motor is stopped, and the induced current generated by the brushless motor is output to the freewheeling circuit 2024. Further, the freewheeling circuit 2024 may perform freewheeling on the induced current from the brushless motor under control of the third drive signal, so that the brushless motor M works stably and continuously. In the period t1, the motor drive circuit 2022 intermittently supplies power to the brushless motor, instead of continuously supplying power to the brushless motor, and the freewheeling circuit 2024 performs freewheeling for the brushless motor. In a case of reducing power consumption of the brushless motor M, a stable working state of the brushless motor M is maintained, and energy is saved. In addition, because the brushless motor M intermittently supplies power to the brushless motor, even if the motor drive circuit 2022 provides an overvoltage turn-on voltage for the brushless motor M, the brushless motor M is not in an overvoltage turn-on state for a long time, and is not damaged due to long-term overvoltage turn-on.

In the turn-off period t2 of the brushless motor M, the motor drive circuit 2022 stops supplying power to the brushless motor, and outputs the induced current generated by the brushless motor to the discharge circuit 2021. The discharge circuit 2021 receives the induced current, and applies work by using the induced current, to consume electric energy of the brushless motor. This accelerates energy consumption of the brushless motor M, so that duration t2 required for turning off the brushless motor M is short, and a quick turn-off effect is achieved.

In the periods t0, t1, and t2 of the brushless motor M, the current monitoring circuit 2025 receives the first monitoring voltage output by the motor drive circuit 2022, and amplifies the first monitoring voltage, to obtain and output the second monitoring voltage. The first monitoring voltage is used to reflect the current value of the brushless motor. Therefore, the second monitoring voltage obtained after amplification can also reflect the current value of the brushless motor. Current monitoring for the brushless motor can be implemented by obtaining a value of the second monitoring voltage. Therefore, when the current of the brushless motor is excessively large, the brushless motor can be controlled to be turned off, to prevent the brushless motor from being damaged due to the excessively large current.

Further, the following can be learned from the foregoing content.

Figure 4A:
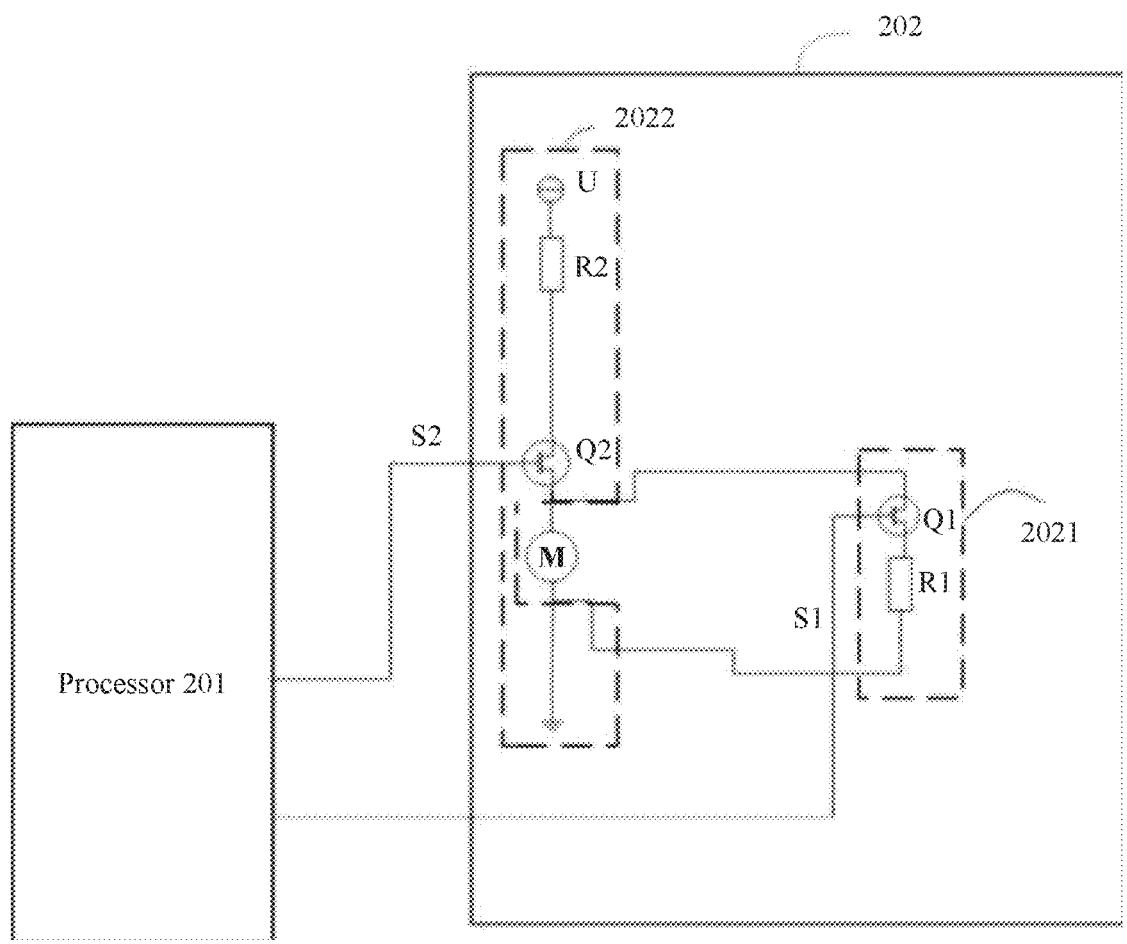
FIG. 4a is a schematic diagram 2 of a structure of an electronic device.

(1) When the brushless motor M wants to implement quick turn-off (that is, shorten the turn-off period t2), the electronic device may be shown in FIG. 4a, and the electronic device includes the processor 201 and the drive control apparatus 202 for the brushless motor. The drive control apparatus 202 for the brushless motor includes the motor drive circuit 2022 and the discharge circuit 2021.

In the period t0 and the period t1, the processor 201 may output a second drive signal S2 that is continuously in a low-level state and S1 that is continuously in a high-level state. The motor drive circuit 2022 is controlled by S2, a branch in which the supply voltage U, R2, Q2, and M are located is always in a connected state, and the motor drive circuit 2022 continuously supplies power to the brushless motor M. S1 is in the high-level state. Therefore, in the period t1, Q1 is cut off, a branch in which Q1 and R1 are located is not conducted, and the discharge circuit 2021 does not work in the periods t0 and t1.

In the period t2, the processor 201 outputs a second drive signal S2 that is continuously in a high-level state and S1 that is in a low-level state. The motor drive circuit 2022 is controlled by S2, and Q2 is cut off. The motor drive circuit 2022 stops supplying power to the brushless motor M, and outputs the induced current generated by the brushless motor to the discharge circuit 2021. The discharge circuit 2021 is controlled by S1, Q1 is in a conducted state, and the induced current in the brushless motor flows through Q1 and R I to apply work, to consume electric energy of the brushless motor and shorten a time required for turning off the brushless motor M.

Figure 4B:
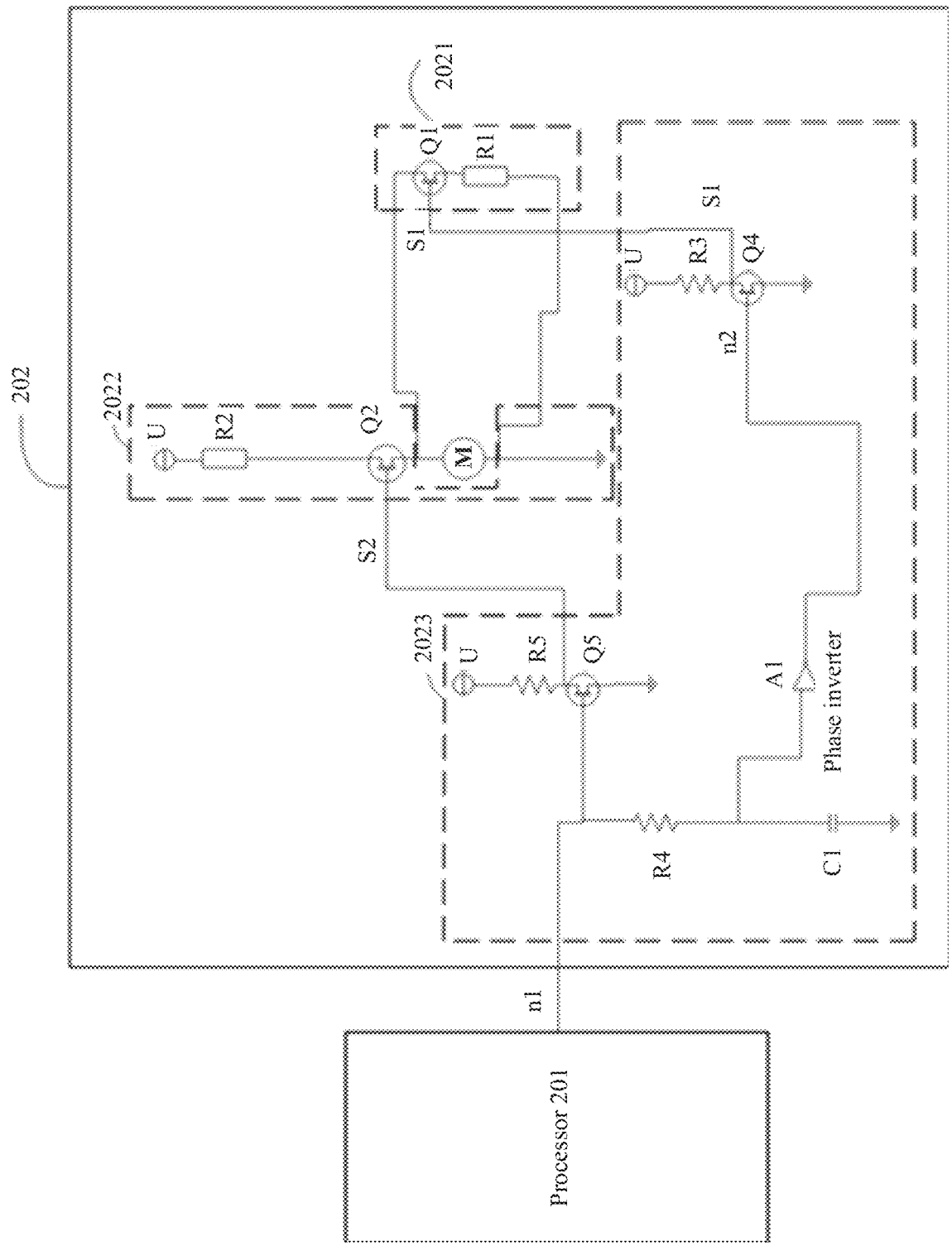
FIG. 4b is a schematic diagram 3 of a structure of an electronic device.

In some other embodiments, the electronic device may alternatively be shown in FIG. 4b. The drive control apparatus 202 for the brushless motor may further include the drive signal generation circuit 2023. The second drive signal S2 and the first drive signal S1 may be generated by using the drive signal generation circuit 2023. For a process in which the drive signal generation circuit 2023 generates S2 and S1 based on the signal n1 output by the processor 201, refer to the related descriptions of the drive signal generation circuit 2023 in FIG. 3a, FIG. 3c(1) and FIG. 3c(2), and FIG. 3d. Details are not described herein again.

Figure 4C:
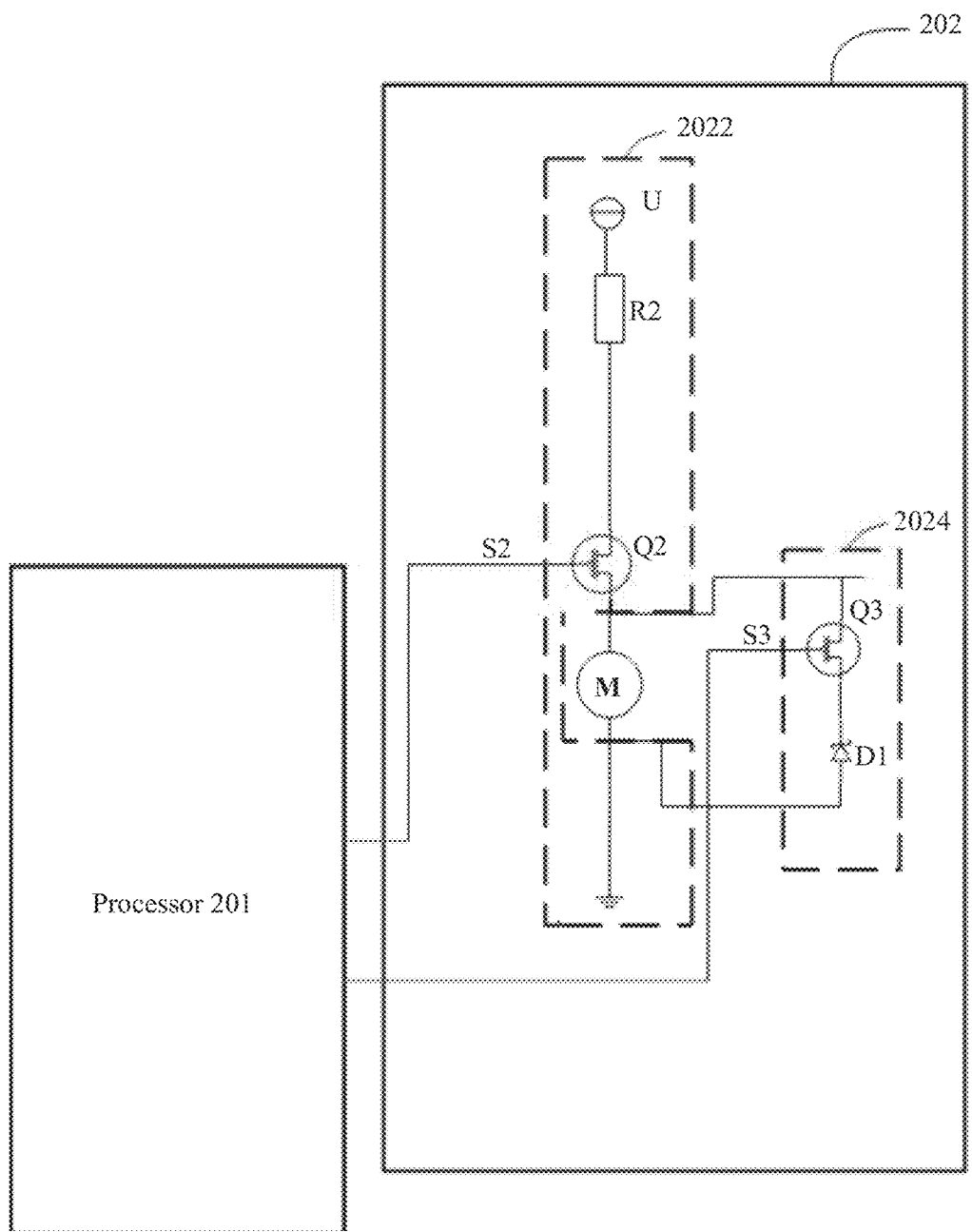
FIG. 4c is a schematic diagram 4 of a structure of an electronic device.

(2) When the brushless motor M wants to implement quick turn-on (that is, shorten the turn-on period t0) and reduce power consumption, the electronic device may be shown in FIG. 4c, and the electronic device includes the processor 201 and the drive control apparatus 202 for the brushless motor. The drive control apparatus 202 for the brushless motor includes the motor drive circuit 2022 and the freewheeling circuit 2024.

In the period t0, the processor 201 may output a second drive signal S2 in a low-level state and a third drive signal S3 in a low-level state. The motor drive circuit 2022 provides an overvoltage turn-on voltage for the brushless motor M under control of the second drive signal S2, so that the brushless motor M is turned on in an overvoltage manner, to quickly turn on the brushless motor. Q3 in the freewheeling circuit 2024 is conducted under control of S3. However, because voltages at two ends of the brushless motor M are inversely applied to two ends of D1, the freewheeling circuit 2024 does not work under control of S3 in the period t0. In the period t1, the processor 201 may output S2 that is a PWM wave and a third drive signal S3 that is in a low-level state. When S2 is at a low level, the motor drive circuit 2022 supplies power to the brushless motor M. When S2 is at a high level, power supply to the brushless motor M is stopped, and the induced current generated by the brushless motor M is output to the freewheeling circuit 2024. Q3 in the freewheeling circuit 2024 is conducted under control of S3, the induced current flows through D1, and D1 performs freewheeling for the brushless motor M, so that stable working of the brushless motor M is maintained, and power consumption is reduced. In addition, because the motor drive circuit 2022 does not continuously supply power to the brushless motor M, the brushless motor M is not always in an overvoltage turn-on state.

In the period t2, the processor 201 outputs S2 in a high-level state and S3 in a high-level state. The motor drive circuit 2022 stops supplying power to the brushless motor M under control of S2, and the brushless motor M is completely turned off after stored energy is used up. The freewheeling circuit 2024 does not work under control of S3.

Figure 4D:
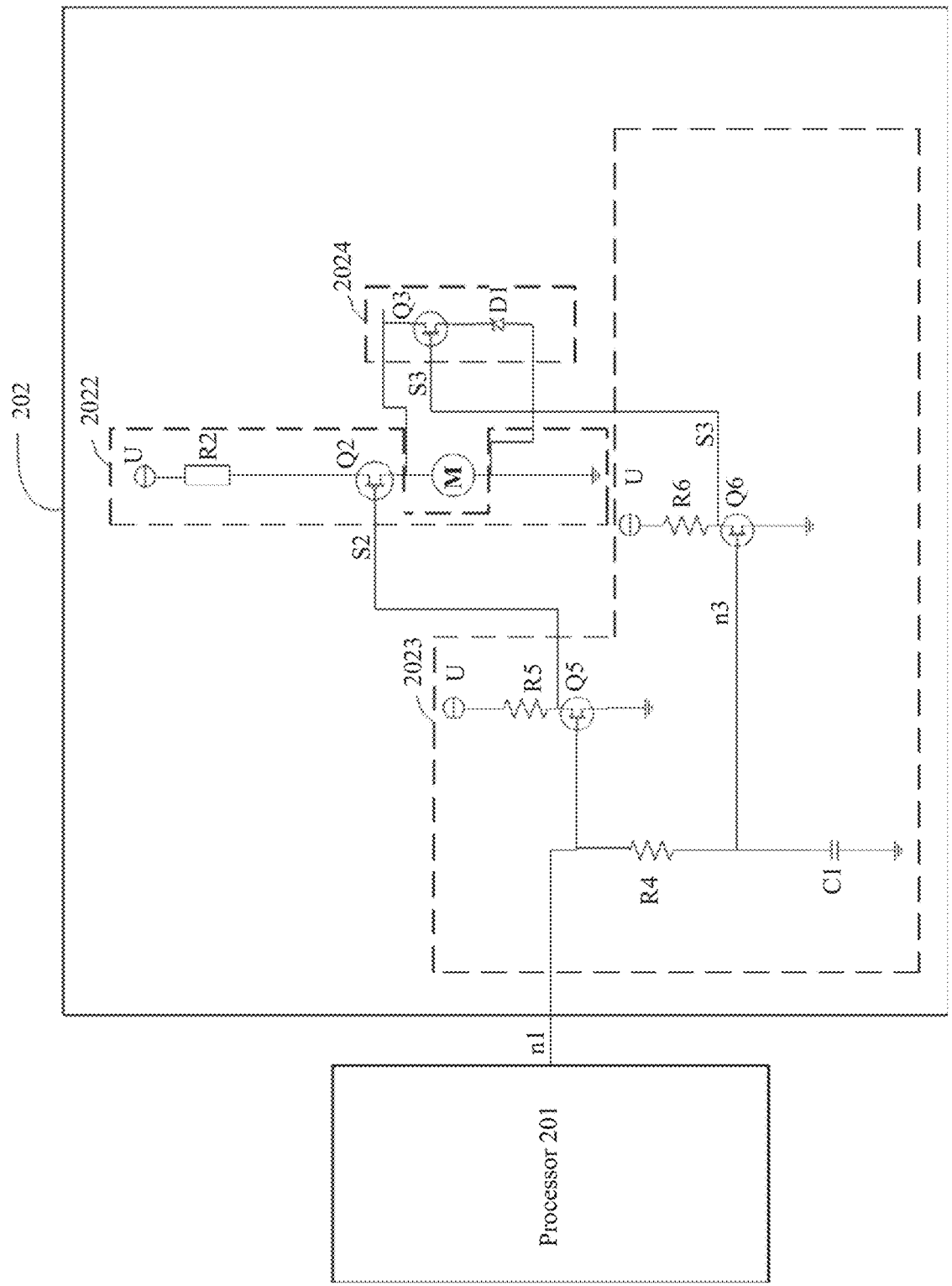
FIG. 4d is a schematic diagram 5 of a structure of an electronic device.

In some other embodiments, as shown in FIG. 4d, the drive control apparatus 202 for the brushless motor may further include the drive signal generation circuit 2023. The second drive signal S2 and the third drive signal S3 may be generated by using the drive signal generation circuit 2023. For a process in which the drive signal generation circuit 2023 generates S2 and S3 based on the signal n1 output by the processor 201, refer to the related descriptions of the drive signal generation circuit 2023 in FIG. 3a, FIG. 3c(1) and FIG. 3c(2), and FIG. 3d. Details are not described herein again.

Figure 4E:
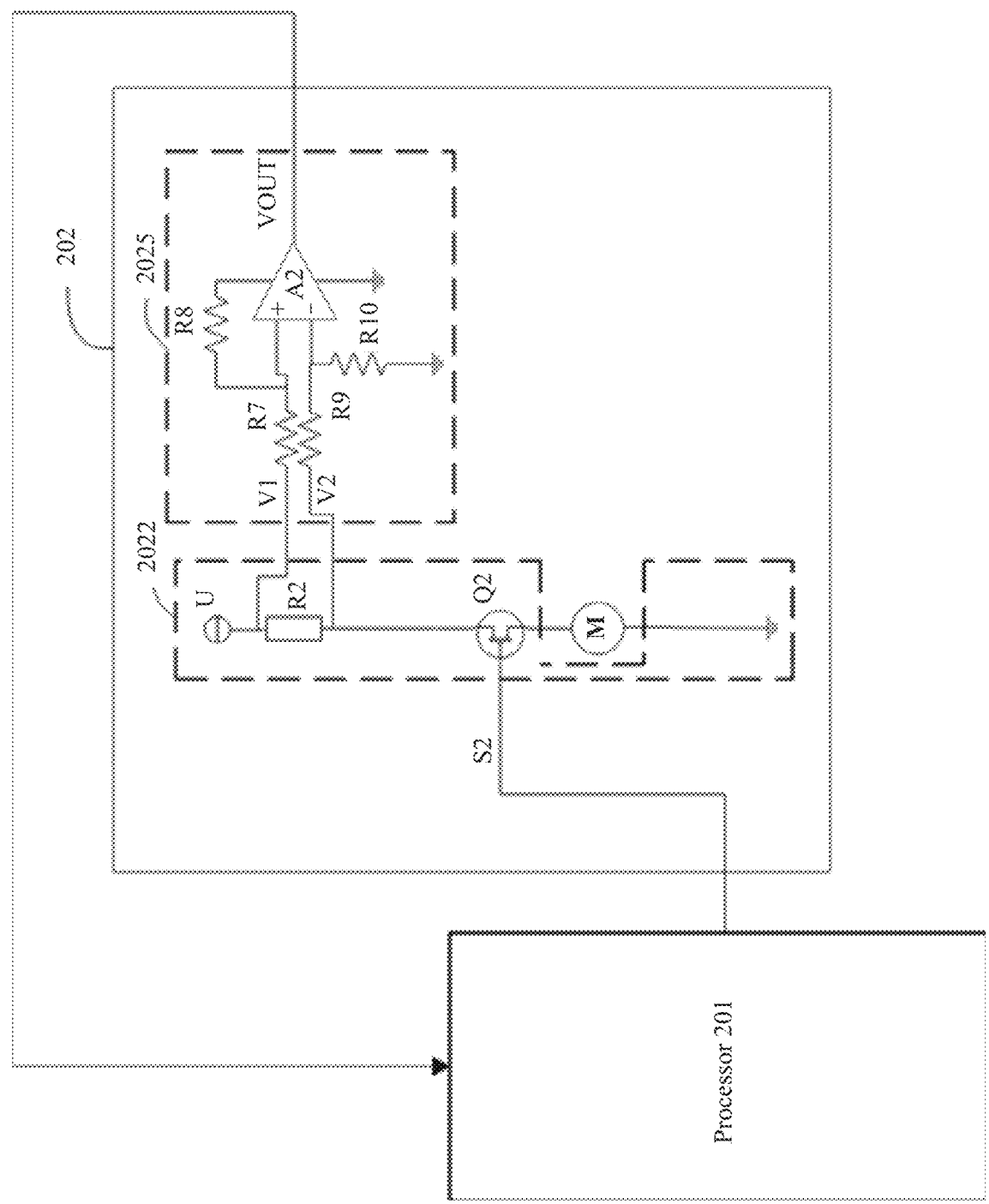
FIG. 4e is a schematic diagram 6 of a structure of an electronic device.
Figure 4F:
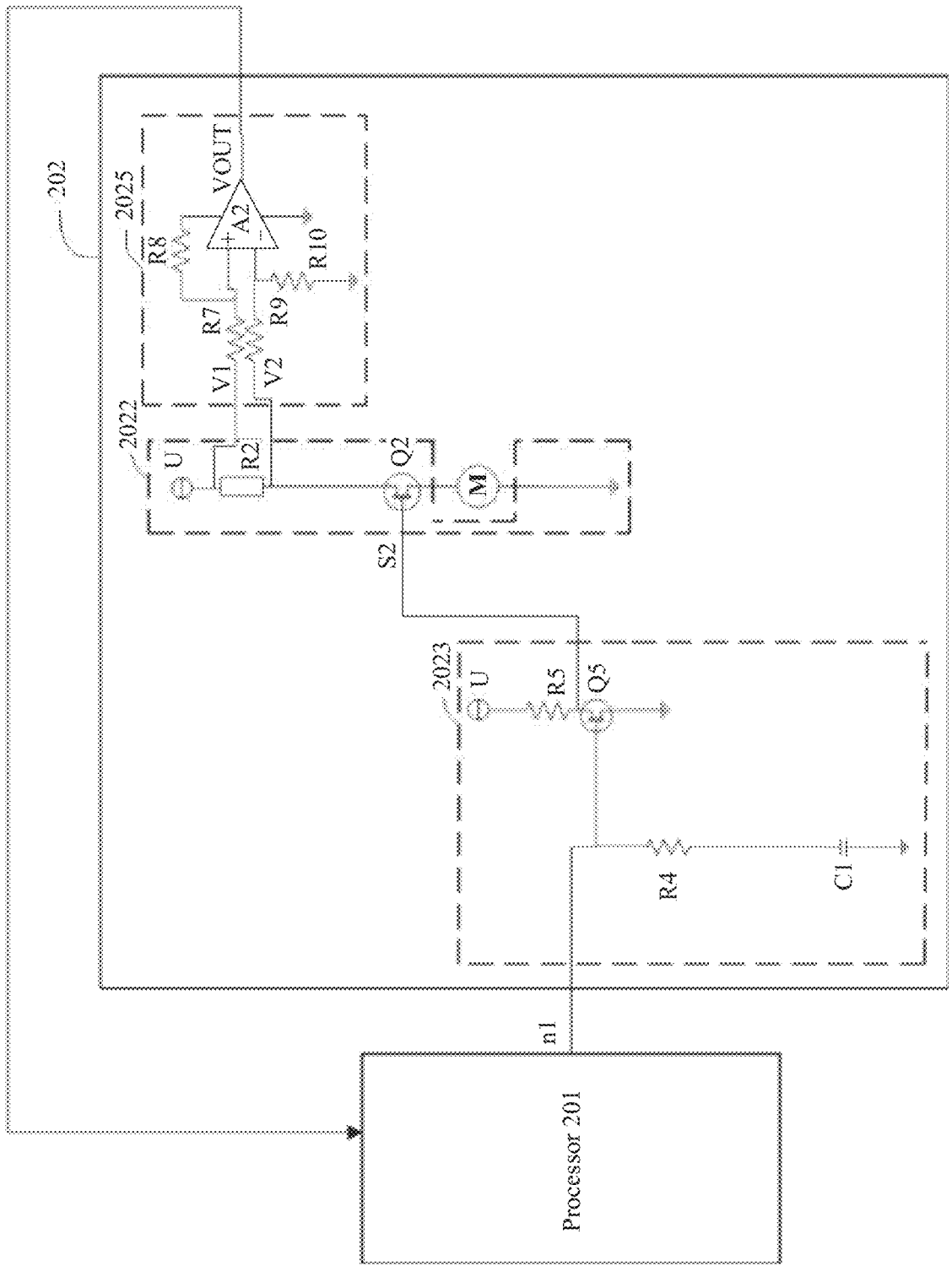
FIG. 4f is a schematic diagram 7 of a structure of an electronic device.

(3) When a current of the brushless motor M needs to be monitored, the electronic device may be shown in FIG. 4e, and the electronic device includes the processor 201 and the drive control apparatus 202 for the brushless motor. The drive control apparatus 202 for the brushless motor includes the motor drive circuit 2022 and the current monitoring circuit 2025.

In the period t0 and the period t1, the processor 201 may output a second drive signal S2 that is continuously in a low-level state. The motor drive circuit 2022 is controlled by S2, a branch in which the supply voltage U. R2, Q2, and M are located is always in a connected state, and the motor drive circuit 2022 continuously supplies power to the brushless motor M. In the period t2, the processor 201 outputs a second drive signal S2 that is continuously in a high-level state. The motor drive circuit 2022 is controlled by S2, Q2 is cut off, and the motor drive circuit 2022 stops supplying power to the brushless motor M.

In the periods to, t1, and t2, the current monitoring circuit 2025 receives the first monitoring voltage (that is, a difference voltage between a first voltage V1 and a second voltage V2) output by the motor drive circuit 2022, and amplifies the first monitoring voltage, to obtain and output the second monitoring voltage Vout. The first monitoring voltage is used to reflect the current value of the brushless motor. Therefore, Vout can also reflect the current value of the brushless motor. The processor 201 may obtain Vout, and monitor the current of the brushless motor M based on Vout. Therefore, when the current value of the brushless motor M is excessively large, the brushless motor M can be turned off, to protect the brushless motor from being damaged by the excessively large current.

In some other embodiments, the drive control apparatus 202 for the brushless motor may further include the drive signal generation circuit 2023. The second drive signal S2 may be generated by using the drive signal generation circuit 2023. For a process in which the drive signal generation circuit 2023 generates S2 based on the signal n1 output by the processor 201, refer to the related descriptions of the drive signal generation circuit 2023 in FIG. 3a, FIG. 3c(1) and FIG. 3c(2), and FIG. 3d. Details are not described herein again.

It should be noted that if the drive control apparatus 202 for the brushless motor wants to implement a plurality of effects (for example, wants to quickly turn on and turn off the brushless motor), the foregoing circuits for implementing related effects may be combined and connected. For a specific connection manner and a specific working process in the combined drive control apparatus 202 for the brushless motor, refer to the foregoing related descriptions in FIG. 2a, FIG. 3a, FIG. 3c(1) and FIG. 3c(2), and FIG. 3d. Details are not described herein again.

Specifically, for working processes and principles of the motor drive circuit 2022, the discharge circuit 2021, the drive signal generation circuit 2023, the freewheeling circuit 2024, and the current monitoring circuit 2025 in the period t0, refer to the related descriptions in FIG. 3a. For those in the period t1, refer to the related descriptions in FIG. 3c(1) and FIG. 3c(2). For those in the period t2, refer to the related descriptions in FIG. 3d. Details are not described herein again.

What is claimed is:

1. An electronic device, comprising:
   a brushless motor; and
   a drive control apparatus for the brushless motor, the drive control apparatus comprising:
      a discharge circuit connected to the brushless motor; and
      a motor drive circuit connected to the brushless motor and the discharge circuit, wherein the motor drive circuit is configured to, during a turn-off period of the brushless motor, stop supplying power to the brushless motor, and output an induced current generated by the brushless motor to the discharge circuit,
      wherein the discharge circuit is configured to, during the turn-off period of the brushless motor, receive the induced current, and apply work by using the induced current, to consume electric energy of the brushless motor,
      wherein the drive control apparatus further comprises a freewheeling circuit connected to the brushless motor and the motor drive circuit, wherein the freewheeling circuit is configured to perform freewheeling on the induced current in the brushless motor during a stable working period of the brushless motor.

2. A drive control apparatus for a brushless motor, comprising:
   a discharge circuit configured to be connected to the brushless motor; and
   a motor drive circuit configured to be connected to the brushless motor and the discharge circuit, wherein the motor drive circuit is configured to, during a turn-off period of the brushless motor, stop supplying power to the brushless motor, and output an induced current generated by the brushless motor to the discharge circuit, and
   wherein the discharge circuit is configured to, during the turn-off period of the brushless motor, receive the induced current, and apply work by using the induced current, to consume electric energy of the brushless motor, and
   wherein the drive control apparatus further comprises a freewheeling circuit connected to the brushless motor and the motor drive circuit, wherein the freewheeling circuit is configured to perform freewheeling on the induced current in the brushless motor during a stable working period of the brushless motor.

3. The drive control apparatus of claim 2, wherein the discharge circuit is configured to, during the turn-off period of the brushless motor, be controlled by a first drive signal to receive the induced current and apply work by using the induced current, to consume the electric energy of the brushless motor.

4. The drive control apparatus of claim 3, wherein the discharge circuit is configured to, during the turn-off period of the brushless motor, be controlled by the first drive signal to receive the induced current and enable the induced current to flow through a discharge component, to apply work by using the discharge component.

5. The drive control apparatus of claim 4, wherein the discharge circuit is further configured to be controlled by the first drive signal to not apply work by using the discharge component during each of a turn-on period and the stable working period of the brushless motor.

6. The drive control apparatus of claim 5, wherein the motor drive circuit is configured to, during the turn-off period of the brushless motor, be controlled by a second drive signal to stop supplying power to the brushless motor, and to output the induced current generated by the brushless motor to the discharge circuit.

7. The drive control apparatus of claim 6, wherein the motor drive circuit is further configured to, during the stable working period of the brushless motor, either a) supply power to the brushless motor when the second drive signal is in a first level state, or b) stop supplying power to the brushless motor and output the induced current generated by the brushless motor to the freewheeling circuit when the second drive signal is in a second level state, wherein the second drive signal during the stable working period is a pulse width modulation signal.

8. The drive control apparatus of claim 7, wherein the motor drive circuit is further configured to be controlled by the second drive signal to continuously provide an overvoltage turn-on voltage for the brushless motor during the turn-on period of the brushless motor.

9. The drive control apparatus of claim 2, wherein the freewheeling circuit is configured to be controlled by a third drive signal to perform freewheeling on the induced current in the brushless motor during the stable working period of the brushless motor.

10. The drive control apparatus of claim 9, wherein the freewheeling circuit comprises:
    a diode having a cathode and an anode; and
    a third switching transistor having a first end connected to the cathode of the diode, a second end connected to a first end of the brushless motor, and a control end configured to receive the third drive signal,
    wherein the anode of the diode is connected to a second end of the brushless motor, and a common end between the diode and the brushless motor is grounded.

11. The drive control apparatus of claim 9, wherein the discharge circuit is controlled by a first drive signal, and the drive control apparatus further comprises a drive signal generation circuit connected to the discharge circuit, wherein the drive signal generation circuit is configured to receive a first control signal, and generate and output the first drive signal based on the first control signal.

12. The drive control apparatus of claim 1, wherein the drive signal generation circuit is configured to:
receive the first control signal, and invert the first control signal to obtain a second control signal; and
generate and output the first drive signal based on the second control signal.

13. The drive control apparatus of claim 12, wherein the drive signal generation circuit comprises:
a third resistor having a first end and a second end;
a fourth resistor having a first end and a second end;
a fourth switching transistor having a first end, a second end, and a control end;
a first capacitor having a first end and a second end; and
a phase inverter having an input end and an output end,
wherein the first end of the third resistor receives a supply voltage, and the second end of the third resistor is connected to the second end of the fourth switching transistor,
wherein the first end of the fourth switching transistor is grounded, and the control end of the fourth switching transistor receives the second control signal,
wherein the first end of the fourth resistor receives the first control signal, the second end of the fourth resistor is connected to the first end of the first capacitor, and a first node comprising the second end of the third resistor and the second end of the fourth switching transistor outputs the first drive signal,
wherein the second end of the first capacitor is grounded, and a second node comprising the second end of the fourth resistor and the first end of the first capacitor outputs a third control signal, and
wherein the input end of the phase inverter is connected to the second node, the output end of the phase inverter is connected to the control end of the fourth switching transistor, the input end of the phase inverter receives the third control signal, and the output end of the phase inverter outputs the second control signal.

14. The drive control apparatus of claim 13, wherein the drive signal generation circuit is further configured to generate and output the third drive signal based on the first control signal.

15. The drive control apparatus of claim 14, wherein the drive signal generation circuit further comprises:
a sixth resistor having a first end that receives a supply voltage, and a second end; and
a sixth switching transistor having a first end that is grounded, a second end connected to the second end of the sixth resistor, and a control end that receives the third control signal, wherein a fourth node comprising the second end of the sixth resistor and the second end of the sixth switching transistor outputs the third drive signal, the third control signal is output from the second node, and a branch in which the fourth resistor and the first capacitor are located receives the first control signal.

16. The drive control apparatus of claim 11, wherein the motor drive circuit is controlled by a second drive signal, and the drive signal generation circuit is further configured to generate and output the second drive signal based on the first control signal.

17. The drive control apparatus of claim 16, wherein the drive signal generation circuit further comprises:
a fifth resistor having a first end that receives a supply voltage, and a second end; and
a fifth switching transistor having a first end that is grounded, a second end connected to the second end of the fifth resistor, and a control end that receives the first control signal, wherein a third node comprising the second end of the fifth resistor and the second end of the fifth switching transistor outputs the second drive signal.

18. The drive control apparatus of claim 2, further comprising a current monitoring circuit connected to the motor drive circuit, wherein the current monitoring circuit is configured to:
receive a first monitoring voltage output by the motor drive circuit; and
amplify the first monitoring voltage to obtain and output a second monitoring voltage, wherein the first monitoring voltage reflects a current value of the brushless motor,
wherein the current monitoring circuit is configured to be connected to a processor of an electronic device, and the second monitoring voltage output by the current monitoring circuit is received by the processor.

19. The drive control apparatus of claim 18, wherein the current monitoring circuit comprises:
a seventh resistor having a first end and a second end;
an eighth resistor having a first end and a second end;
a ninth resistor having a first end and a second end;
a tenth resistor having a first end and a second end; and
an operational amplifier having an in-phase input end, an inverting input end, a positive power end, a negative power end, and an output end,
wherein the first end of the seventh resistor receives a first voltage, and the second end of the seventh resistor is connected to the in-phase input end of the operational amplifier,
wherein the first end of the eighth resistor is connected to the in-phase input end of the operational amplifier, and the second end of the eighth resistor is connected to the positive power end of the operational amplifier,
wherein the first end of the ninth resistor receives a second voltage, the second end of the ninth resistor is connected to the inverting input end of the operational amplifier, and a difference between the first voltage and the second voltage is a value of the first monitoring voltage,
wherein the first end of the tenth resistor is connected to the inverting input end of the operational amplifier, and the other second end of the tenth resistor is grounded, and
wherein the negative power end of the operational amplifier is grounded, and the output end of the operational amplifier outputs the second monitoring voltage.

20. The drive control apparatus for a brushless motor according to of claim 2, wherein the motor drive circuit is further configured to:
during the stable working period of the brushless motor, either a) supply power to the brushless motor when the second drive signal is in a first level state, or b) stop supplying power to the brushless motor and output the induced current generated by the brushless motor to the freewheeling circuit when the second drive signal is in a second level state, wherein the second drive signal during the stable working period is a pulse width modulation signal; and
be controlled by a second drive signal to continuously provide an overvoltage turn-on voltage for the brushless motor during a turn-on period of the brushless motor.

* * * * *

UNITED STATES PATENT AND TRADEMARK OFFICE
CERTIFICATE OF CORRECTION

PATENT NO. : 12,206,353 B2
APPLICATION NO. : 18/041765
DATED : January 21, 2025
INVENTOR(S) : Wenbo Zou Page 1 of 1

It is certified that error appears in the above-identified patent and that said Letters Patent is hereby corrected as shown below:

In the Claims

Claim 12, Column 27, Line 1: "claim 1" should read "claim 11"

Claim 20, Column 28, Lines 50-51: "apparatus for a brushless motor according to of claim 2" should read "apparatus of claim 2"

Signed and Sealed this
Twenty-fifth Day of March, 2025

Coke Morgan Stewart
*Acting Director of the United States Patent and Trademark Office*